(12) United States Patent
Kwon

(10) Patent No.: US 11,973,723 B2
(45) Date of Patent: *Apr. 30, 2024

(54) METHOD FOR TRANSMITTING MESSAGE AND ELECTRONIC DEVICE THEREOF

(71) Applicant: Samsung Electronics Co., Ltd., Suwon-si (KR)

(72) Inventor: Choel-Hwi Kwon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,176

(22) Filed: Apr. 22, 2022

(65) Prior Publication Data

US 2022/0247698 A1    Aug. 4, 2022

Related U.S. Application Data

(63) Continuation of application No. 17/000,719, filed on Aug. 24, 2020, now Pat. No. 11,316,805, which is a (Continued)

(30) Foreign Application Priority Data

Apr. 2, 2013    (KR) .......................... 10-2013-0036002

(51) Int. Cl.
*H04L 51/00*    (2022.01)
*G06F 21/84*    (2013.01)
(Continued)

(52) U.S. Cl.
CPC .............. *H04L 51/00* (2013.01); *G06F 21/84* (2013.01); *H04M 1/72436* (2021.01);
(Continued)

(58) Field of Classification Search
CPC ... H04L 51/00; H04M 1/72436; H04M 1/673; H04M 2250/22; G06F 21/84; G06F 2221/032
See application file for complete search history.

(56) References Cited

U.S. PATENT DOCUMENTS 7,597,619 B2    10/2009 Crivelli et al.
7,876,335 B1    1/2011 Pittenger et al.
(Continued)

FOREIGN PATENT DOCUMENTS

CN    101000674 A    7/2007
CN    101226452 A    7/2008
(Continued)

OTHER PUBLICATIONS

Korean Notice of Patent Grant dated Dec. 23, 2019, issued in Korean Application No. 10-2013-0036002.
(Continued)

*Primary Examiner* — James T Tsai
(74) *Attorney, Agent, or Firm* — Jefferson IP Law, LLP

(57) ABSTRACT

A method and an apparatus for transmitting a message in an electronic device are provided. The method for transmitting a hidden message includes displaying one or more hiding frames in an input message display area of a display, and transmitting a message including information on the hiding frame.

16 Claims, 27 Drawing Sheets

Related U.S. Application Data continuation of application No. 14/219,401, filed on Mar. 19, 2014, now abandoned.

(51) Int. Cl.
*H04M 1/673* (2006.01)
*H04M 1/72436* (2021.01)

(52) U.S. Cl.
CPC ....... *G06F 2221/032* (2013.01); *H04M 1/673* (2013.01); *H04M 2250/22* (2013.01)

(56) References Cited

U.S. PATENT DOCUMENTS

| | | | |
|---|---|---|---|
| 8,456,654 | B2 | 6/2013 | Kelly et al. |
| 8,669,950 | B2 | 3/2014 | Forstall et al. |
| 8,776,249 | B1 | 7/2014 | Margolin |
| 9,203,791 | B1 | 12/2015 | Olomskiy |
| 2002/0059447 | A1 | 5/2002 | Nguyen |
| 2004/0015729 | A1 | 1/2004 | Elms et al. |
| 2004/0162877 | A1 | 8/2004 | Van Dok et al. |
| 2006/0294237 | A1 | 12/2006 | Nguyen |
| 2010/0229246 | A1 | 9/2010 | Warrington et al. |
| 2011/0247081 | A1 | 10/2011 | Shelton |
| 2012/0028659 | A1* | 2/2012 | Whitney ............ H04M 1/7243 455/466 |
| 2012/0054001 | A1 | 3/2012 | Zivkovic et al. |
| 2012/0256854 | A1 | 10/2012 | Lee et al. |
| 2012/0256886 | A1 | 10/2012 | Ryu et al. |
| 2013/0082985 | A1 | 4/2013 | Sasakura |
| 2013/0162667 | A1* | 6/2013 | Eskolin ................ G09G 5/14 345/619 |
| 2013/0194301 | A1* | 8/2013 | Robbins ............... G06F 21/60 345/629 |
| 2013/0227705 | A1* | 8/2013 | Yoon .................. G06F 3/04842 726/27 |
| 2014/0095634 | A1 | 4/2014 | Govindaraman |
| 2014/0201527 | A1 | 7/2014 | Krivorot |
| 2014/0268244 | A1 | 9/2014 | Sheridan et al. |
| 2014/0366158 | A1 | 12/2014 | Han et al. |
| 2014/0380231 | A1 | 12/2014 | Tupper |
| 2016/0139772 | A1 | 5/2016 | Peng |

FOREIGN PATENT DOCUMENTS

| | | |
|---|---|---|
| CN | 101727275 A | 6/2010 |
| CN | 101763270 A | 6/2010 |
| CN | 102025815 A | 4/2011 |
| EP | 1 681 841 A1 | 7/2006 |
| EP | 1681841 A1 | 7/2006 |
| JP | 5021856 B1 | 9/2012 |
| KR | 10-2000-0050085 A | 8/2000 |
| KR | 10-2001-0096391 A | 11/2001 |
| KR | 2003-0073182 A | 9/2003 |
| KR | 10-0605456 B1 | 7/2006 |
| KR | 10-2011-0024632 A | 3/2011 |
| KR | 10-2012-0076698 A | 7/2012 |

OTHER PUBLICATIONS

European Office Action dated Feb. 7, 2020, issued in European Application No. 14161258.0-1218.
Korean Office Action dated Jun. 18, 2019, issued in Korean Application No. 10-2013-0036002.
Chinese Office Action dated May 31, 2019, issued in Chinese Application No. 201410131853.9.
Chinese Fourth Office Action dated Oct. 18, 2018, issued in Chinese Application No. 201410131853.9.
European Office Action dated May 30, 2018. Issued in European Application No. 14161258.0-1218. Ref. DK/D215423EP.
Chinese Office Action dated Jan. 2, 2018, issued in Chinese Patent Application No. 201410131853.9.
How to hide text in MS Word 2007, Aug. 25, 2008.
European Summons to Attend Oral Proceedings dated Oct. 1, 2020, issued in European Application No. 14161258.0.
Chinese Office Action dated Dec. 28, 2022, issued in Chinese Application No. 201910861686.6.
Online Tech Tips, "How to hide text in MS Word 2007," www.online-tech-tips.com'ms-office-tips/word-hidden-text/. Aug. 25, 2008.
European Search Report dated Apr. 6, 2023, issued in European Application No. 23150934.0.
Chinese Office Action with English translation dated Nov. 7, 2023; Chinese Appln. No. 201910861686.6.
Chinese Office Action with English translation dated Feb. 3, 2024; Chinese Appln. No. 201910861686.6.

* cited by examiner

METHOD FOR TRANSMITTING MESSAGE AND ELECTRONIC DEVICE THEREOF

CROSS-REFERENCE TO RELATED APPLICATION(S)

This application is a continuation application of prior application Ser. No. 17/000,719 filed on Aug. 24, 2020, which issued as U.S. Pat. No. 11,316,805 on Apr. 26, 2022; which is a continuation application of prior application Ser. No. 14/219,401 filed on Mar. 19, 2014; and which is based on and claims priority under 35 U.S.C § 119(a) of a Korean patent application number 10-2013-0036002, filed on Apr. 2, 2013, in the Korean Intellectual Property Office, the disclosure of which is incorporated by reference herein in its entirety.

TECHNICAL FIELD

The present disclosure relates to a method for transmitting a message and an electronic device thereof.

BACKGROUND

With the development of information, communication, and semiconductor technologies, electronic devices are now able to function as multimedia devices, which provide a variety of multimedia services. For example, electronic devices are now able to provide various multimedia services such as a message service, a broadcasting service, a wireless Internet service, a camera service, a music playback service, etc.

As the message service has developed from a Short Message Service (SMS) for transmitting a message of a simple text into a Long Message Service (LMS) for transmitting a message of a long text or a Multimedia Message Service (MIMS) for transmitting a message including a multimedia file such as an image, a moving image, etc., the message service is able to provide various messenger services to users.

However, when the electronic device checks a received message, the electronic device displays the entire text of the received message on a display. Therefore, important information which has been received and transmitted using a message in the electronic device may be easily exposed to the outside. Accordingly, there exists a need for an improved apparatus and method for transmitting and receiving a message in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting a message in an electronic device.

Another aspect of the present disclosure is to provide a method and apparatus for generating a message in which at least part of a text is hidden in an electronic device, and transmitting the message.

Another aspect of the present disclosure is to provide a method and apparatus for generating a message in which at least part of a text is hidden using a touch pen in an electronic device, and transmitting the message.

Another aspect of the present disclosure is to provide a method and apparatus for checking a message in which at least part of a text is hidden in an electronic device.

Another aspect of the present disclosure is to provide a method and apparatus for checking a message in which at least part of a text is hidden using a touch pen in an electronic device.

Another aspect of the present disclosure is to provide a method and apparatus for checking a message in which at least part of a text is hidden through user authentication in an electronic device.

Another aspect of the present disclosure is to provide a method and apparatus for limiting a number of times a message in which at least part of a text is hidden is checked in an electronic device.

In accordance with an aspect of the present disclosure, a method for transmitting a message in an electronic device is provided. The method includes displaying one or more hiding frames in an input message display area of a display, and transmitting a message including information on the hiding frame.

In accordance with another aspect of the present disclosure, a method for checking a message in an electronic device is provided. The method includes checking whether a message to be displayed on a display includes one or more hiding areas, and, when the message includes the one or more hiding areas, displaying on the display a message text except for a message text that is included in the one or more hiding areas.

In accordance with another aspect of the present disclosure, an electronic device is provided. The electronic device includes a display, and at least one processor, wherein the processor is configured to control to display one or more hiding frames in an input message display area of the display, and to transmit a message including information on the hiding frame.

In accordance with another aspect of the present disclosure, an electronic device is provided. The electronic device includes a display, and at least one processor, wherein, when a message to be displayed on the display includes one or more hiding areas, the processor is configured to control to display on the display a message text except for a message text that is included in the one or more hiding areas.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, a method and apparatus for transmitting a message in which at least part of a text is hidden will be described according to various embodiments of the present disclosure.

Hereinafter, an electronic device according to various embodiments of the present disclosure may be a device that can transmit a message, such as a portable electronic device, a portable terminal, a mobile terminal, a mobile pad, a media player, a Personal Digital Assistant (PDA), a desktop computer, a laptop computer, a smart phone, a net-book computer, a television, a Mobile Internet Device (MID), an Ultra Mobile PC (UMPC), a tablet PC, a navigation device, a smart TV, a watch, a digital camera, an MP3 player, etc. In addition, the electronic device may be any electronic device that combines functions of two or more devices of the above-mentioned devices.

A message in the following description may include one or more messages of the messages transmitted through a Short Message Service (SMS), a Long Message Service (LMS), a Multimedia Message Service (MMS), and a messenger service.

Figure 1:
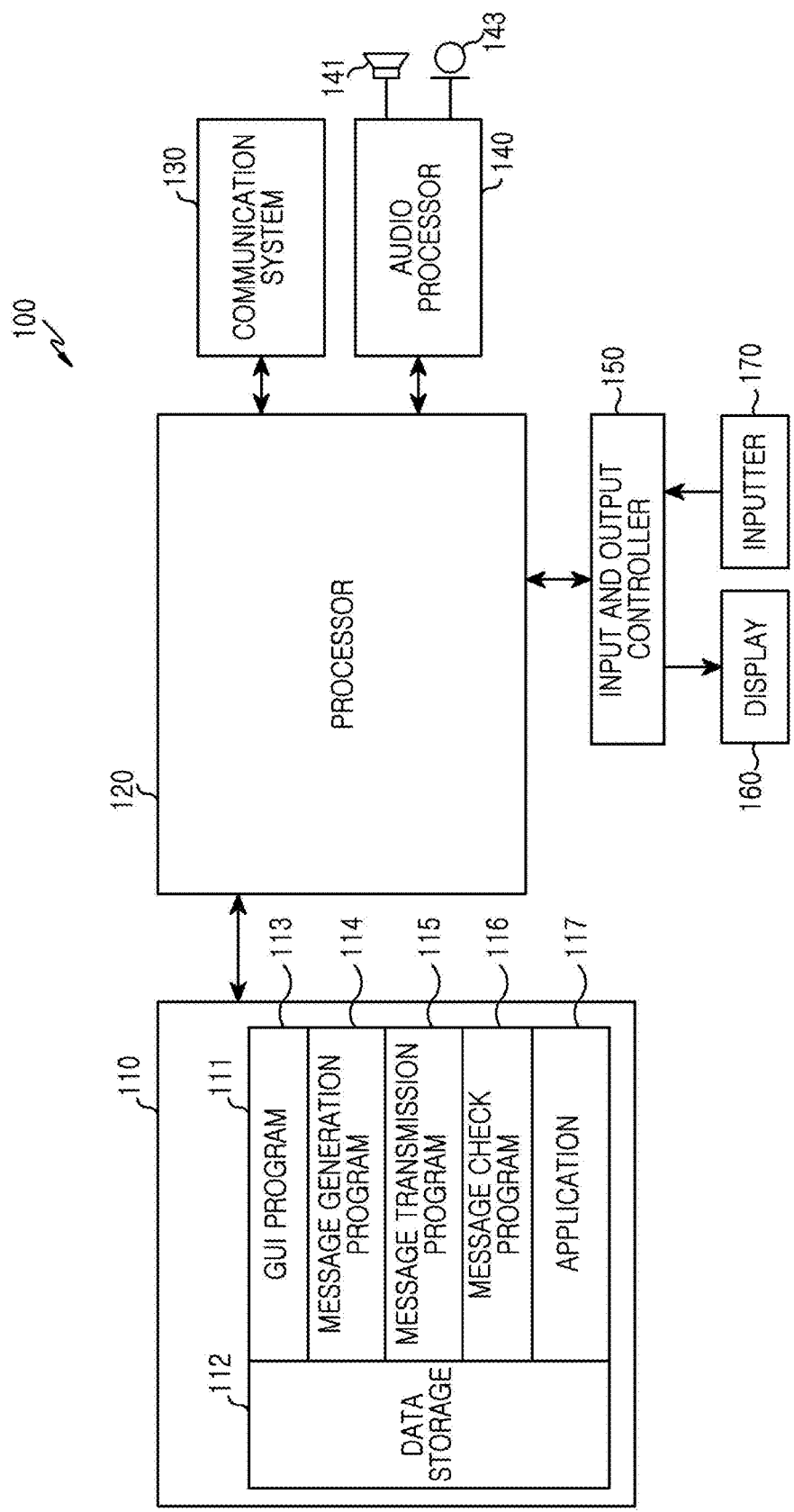
FIG. 1 is a block diagram of an electronic device according to an embodiment of the present disclosure.
Figure 8A:
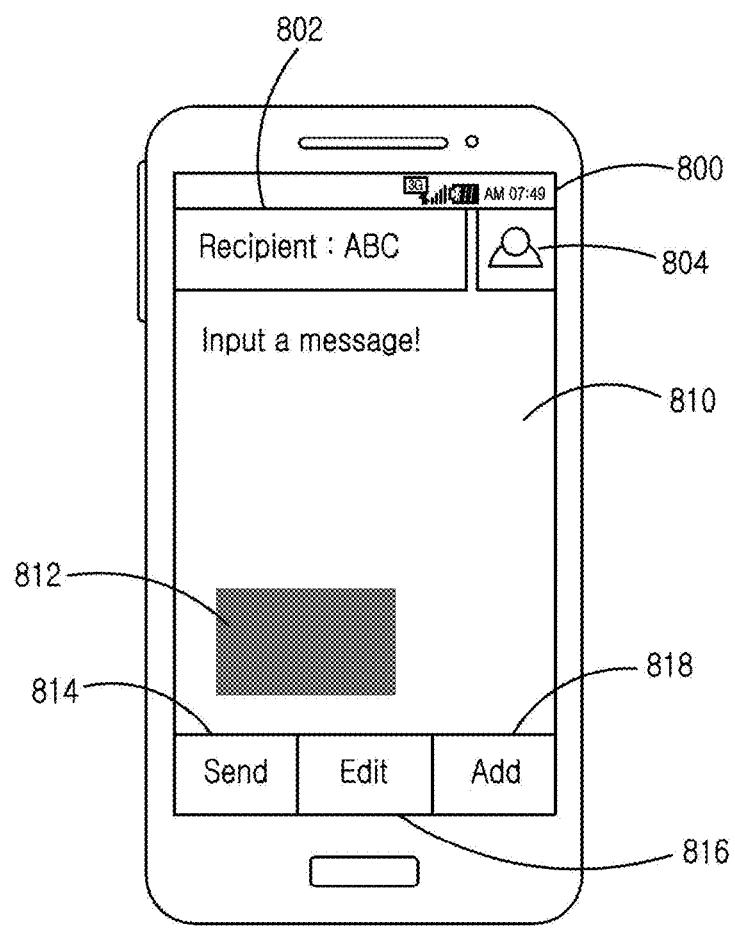
FIGS. 8A, 8B, and 8C are views illustrating screen configurations for generating a hidden message in an electronic device according to a third embodiment of the present disclosure.
Figure 8B:
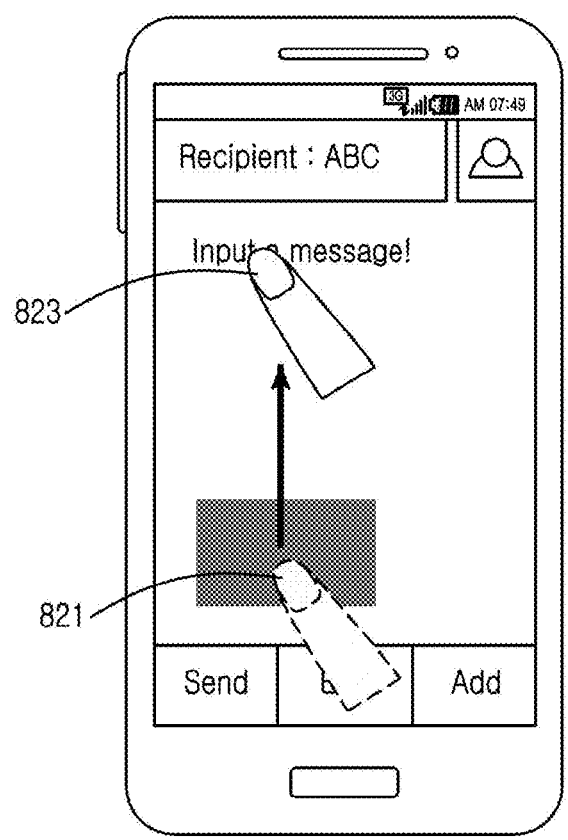
Figure 8C:
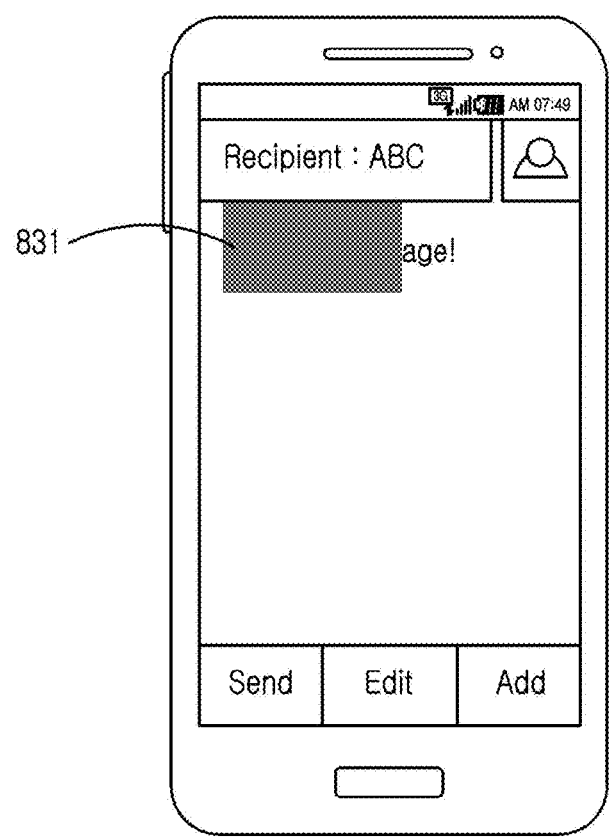

FIG. 1 is a block diagram of an electronic device according to an embodiment of the present disclosure. FIGS. 5A, 5B, 5C, and 5D are views illustrating screen configurations for generating a hidden message in an electronic device according to the first embodiment of the present disclosure. FIGS. 6A, 6B, 6C, and 6D are views illustrating screen configurations for generating a hidden message in an electronic device according to a second embodiment of the present disclosure. FIGS. 8A, 8B, and 8C are views illustrating screen configurations for generating a hidden message in an electronic device according to a third embodiment of the present disclosure. FIGS. 14A, 14B, 14C, 14D, 14E, and 14F are views illustrating screen configurations for checking a hidden message in an electronic device according to an embodiment of the present disclosure.

Referring to FIG. 1, the electronic device 100 may include a memory 110, a processor 120, a communication system 130, an audio processor 140, an input and output controller 150, a display 160, and an inputter 170. The memory 110 recited herein may exist in plural number.

The memory 110 may include a program storage 111 to store a program for controlling an operation of the electronic device 100, and a data storage 112 to store data which is generated while a program is being performed. The memory 110 may be a volatile memory (for example, a Random Access Memory (RAM)) or a non-volatile memory (for example, a flash memory), or a combination thereof.

The data storage 112 may store hiding frame setting information. The hiding frame setting information may include one or more pieces of shape information of a hiding frame to be added to a message and size information of the hiding frame. The shape of the hiding frame may include a polygon, a circle, an oval, a text balloon, a heart, etc. The hiding frame may indicate information that visualizes an area where at least part of a text is hidden in the message in the form of the hiding frame and displays the hiding frame.

The program storage 111 may include a Graphic User Interface (GUI) program 113, a message generation program 114, a message transmission program 115, a message check program 116, and one or more applications 117. A program included in the program storage 111 is a set of instructions and may be represented as an instruction set.

Figure 5A:
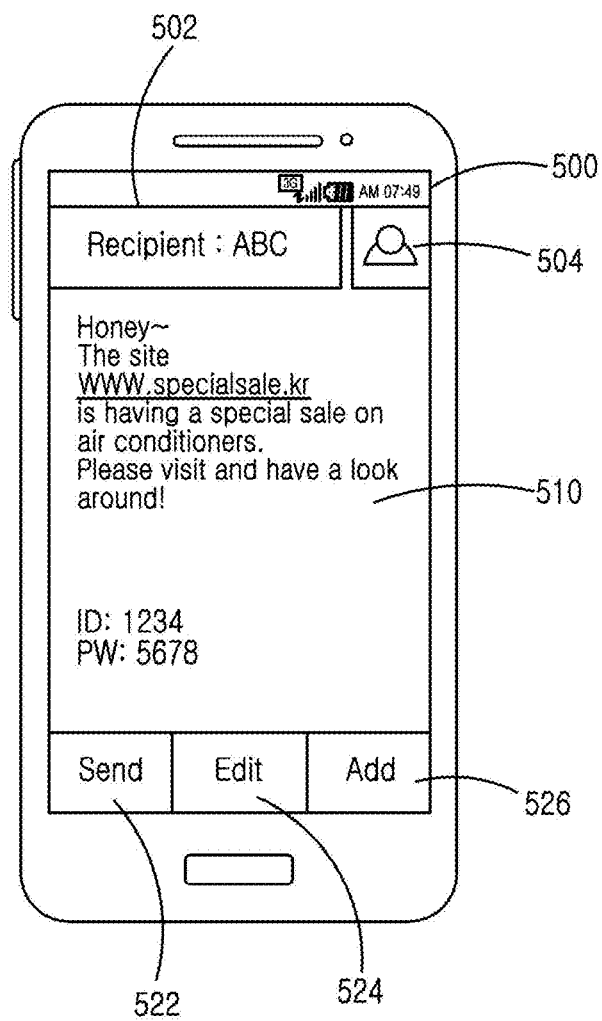
FIGS. 5A, 5B, 5C, and 5D are views illustrating screen configurations for generating a hidden message in an electronic device according to the first embodiment of the present disclosure.

The GUI program 113 includes one or more software elements for providing a user interface using graphics through the display 160. The GUI program 113 may control to display information on an application driven by the processor 120 on the display 160. For example, the GUI program 113 may control to display a message generated through the message generation program 114 on the display 160 as shown in FIG. 5A. In this case, the GUI program 113 may control to display a touch input window for inputting a message using a touch pen on the display 160. When the message generation program 114 generates a hidden message, the GUI program 113 may control the display 160 to display a hiding frame on one or more hiding areas determined by the message generation program 114. For example, the GUI program 113 may control to display one or more hiding frames on the message displayed on the display 160 as shown in FIGS. 5A to 5D and FIGS. 6A to 6D. The GUI program 113 may control to display one or more hiding frames on a message display area for displaying a message as shown in FIGS. 8A to 8C. In this case, the GUI program 113 may control to display a hiding frame of a shape and size according to the hiding frame setting information stored in the data storage 112 on the display 160 or to display a hiding frame of a shape and size according to touch information for setting the hiding area on the display 160.

Figure 14A:
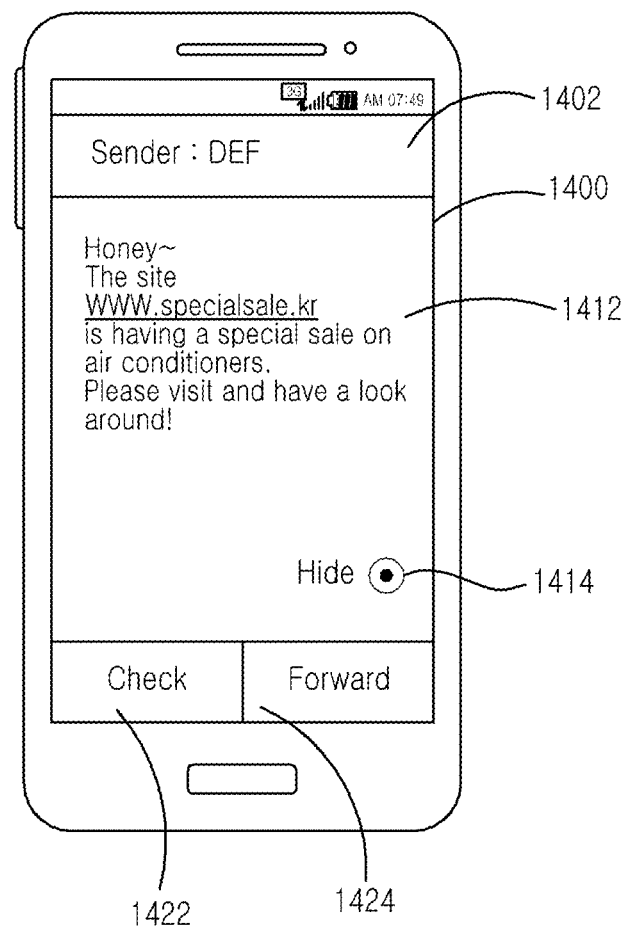
FIGS. 14A, 14B, 14C, 14D, 14E, and 14F are views illustrating screen configurations for checking a hidden message in an electronic device according to an embodiment of the present disclosure.
Figure 14B:
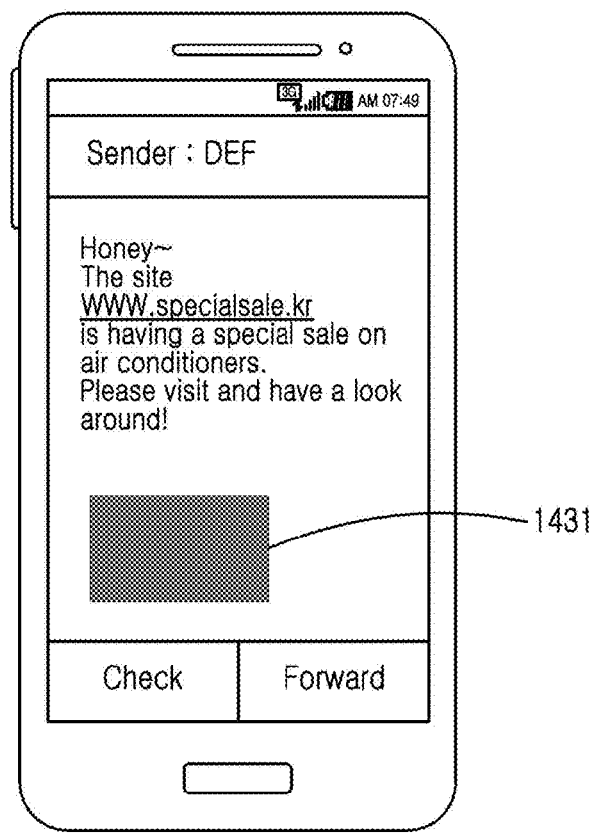
Figure 14C:
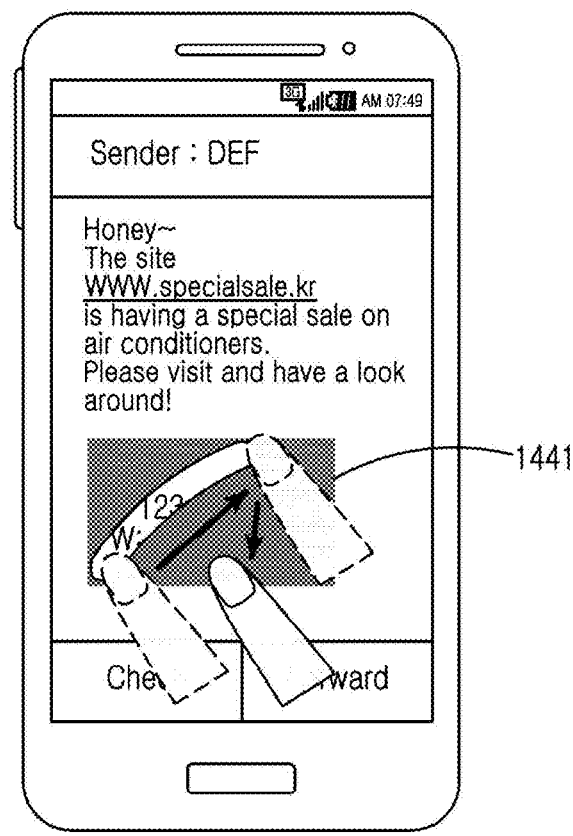
Figure 14D:
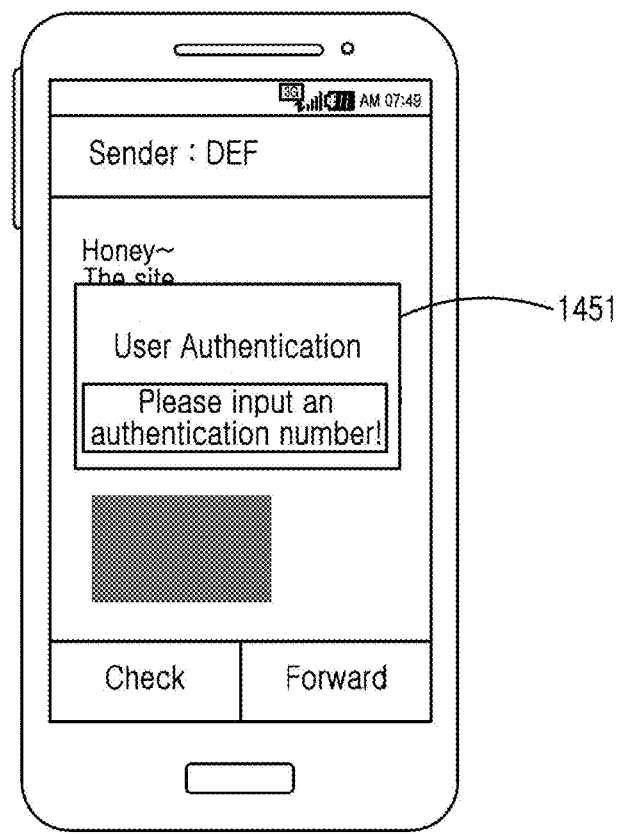
Figure 14E:
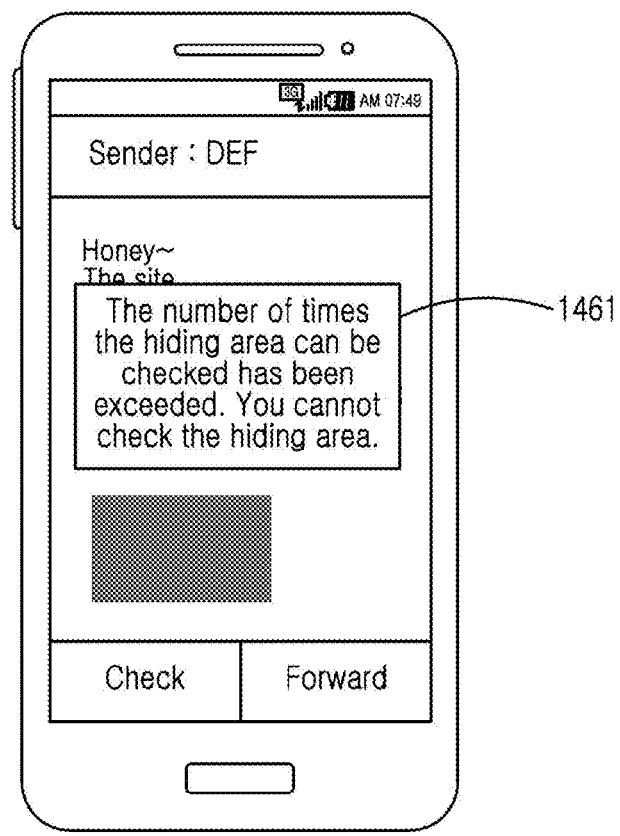
Figure 14F:

For another example, the GUI program 113 may control to display the message checked by the message check program 116 on the display 160. When the message check program 116 checks hiding area information on the message, the GUI program 113 may control to display the message on the display 160 without displaying a text of the hiding area in the received message as shown in FIG. 14A. When a hiding area checking event occurs, the GUI program 113 may control to display a hiding frame 1431 on the display 160 as shown in FIG. 14B. When the message check program 116 checks an input corresponding to a hiding check option of the hiding frame, the GUI program 113 may control to display the message text hidden by the hiding frame on the display 160 as shown in FIGS. 14C and 14F.

The message generation program 114 includes one or more software elements for generating the message. For example, the message generation program 114 may create the message according to touch information of a keypad or input information by a touch pen, which is provided from the inputter 170.

When a hidden message is generated, the message generation program 114 may determine one or more hiding areas for hiding at least part of a text in the message. In this case, the message generation program 114 may determine the one or more hiding areas at one or more points of time of before, during, and after the message is created. For example, when a touch on the message display area by a touch pen or user's finger is sensed, the message generation program 114 may recognize that a setting event for hiding occurs. Accordingly, the message generation program 114 may set the one or more areas of the message display area where the touch is sensed, as the hiding area. For another example, the message generation program 114 may set one or more hiding areas by considering touch information on the message display area, after the setting event for hiding occurs. In this case, the message generation program 114 may determine whether the setting event for hiding occurs by considering one of selection of a hiding setting icon, selection of a hiding setting menu, and sensing of a gesture mapped onto the setting event for hiding. The hiding area recited herein indicates an area for displaying the hiding frame for hiding at least part of the text of the message.

The message generation program 114 may set the hiding check option on the hiding area. For example, the message generation program 114 may set an option to check hiding information simply by a scratch operation of a touch pen on the hiding frame. For another example, the message generation program 114 may set an authentication key for the hiding frame. For another example, the message generation program 114 may limit the number of times the hiding frame can be checked. For another example, the message generation program 114 may set as the hiding check option two or more methods of the scratch operation using the touch pen, the authentication key setting method, and the method of setting the number of times the hiding frame can be checked. The scratch operation of the touch pen may indicate a series of operations of scratching the hiding frame with the touch pen.

When a plurality of pieces of hiding information are included in a single message, the message generation program 114 may set the same hiding check option for the plurality of pieces of hiding information or may set a different hiding check option for each piece of hiding information.

The message transmission program 115 includes one or more software elements for transmitting the message generated by the message generation program 114 to a counterpart electronic device. For example, the message transmission program 115 may control to transmit the hidden message generated by the message generation program 114 to the counterpart electronic device through the communication system 130. In this case, the message transmission program 115 may control to discriminate between the message generated by the message generation program 114 and the hiding area information on the message, and to transmit the message to the counterpart electronic device. The hiding area information may include one or more pieces of information of location, size, and shape information of the hiding frame included in the message.

The message check program 116 includes one or more software elements for checking a message received from the counterpart electronic device. For example, the message check program 116 may check the text of the message received through the communication system 130. When the message includes hiding area information on the message, the message check program 116 may control not to display the part of the text that is hidden in the message. Thereafter, when the hiding area checking event occurs, the message check program 116 may control to display the hiding frame in which the part of the text of the message is hidden. In addition, when an input corresponding to the hiding check option of the hiding frame is received from the inputter 170, the message check program 116 may control to remove display of the hiding frame.

The application 117 includes a software element for at least one application installed in the electronic device 100.

The processor 120 controls the electronic device 100 to provide various multimedia services using at least one software program. In this case, the processor 120 executes at least one program stored in the memory 110 and provides a service corresponding to the corresponding program.

The communication system 130 may perform a communication function of transmitting and receiving the message to and from the counterpart electronic device. In this case, the communication system 130 may be divided into a plurality of communication sub-modules which support different communication networks. For example, although not limited thereto, the communication network includes a Global System for Mobile communications (GSM) network, an Enhanced Data rates for GSM Evolution (EDGE) network, a Code Division Multiple Access (CDMA) network, a Wideband-CDMA (W-CDMA) network, a Long Term Evolution (LTE) network, an Orthogonal Frequency-Division Multiplexing Access (OFDMA) network, a wireless Local Area Network (LAN), a Bluetooth network, Near Field Communication (NFC), etc.

The audio processor 140 provides an audio interface between the user and the electronic device 100 through a speaker 141 and a microphone 142.

The input and output controller 150 provides an interface between an input and output device, like the display 160, and the inputter 170 and the processor 120.

The display 160 displays state information of the electronic device 100, a text input by the user, a moving image or still image, etc. For example, the display 160 may display the message generated through the message generation program 114 as shown in FIG. 5A. In this case, the display 160 may display the hiding frame on one or more hiding areas determined by the message generation program 114. For example, the display 160 may display one or more hiding frames on the area where the message is displayed as shown in FIGS. 5B to 5D and FIGS. 6A to 6D. In this case, the display 160 may display the hiding frame by superimposing another separate layer where the hiding frame is displayed on an upper end of a layer where the message is displayed. Accordingly, the display 160 can hide a message text of a location where the hiding frame is displayed. Meanwhile, the display 160 may display one or more hiding frames on the message display area as shown in FIGS. 8A to 8C. In this case, the display 160 may display the hiding frame by superimposing another separate layer where the hiding frame is displayed on an upper end of a layer for displaying the message. Accordingly, the display 160 can hide the text of the message of a location where the hiding frame is displayed.

For another example, the display 160 may display the message checked by the message check program 116. When the message check program 116 checks a hidden message, the display 160 may display the received message without displaying the hiding area as shown in FIG. 14A. When the hiding area checking event occurs, the display 160 may display a hiding frame 1431 on the hiding area of the message as shown in FIG. 14B. When the message check program 116 checks an input on the hiding check option of the hiding frame, the display 160 may display the message text hidden by the hiding frame as shown in FIGS. 14C and 14F.

The inputter 170 provides input data generated by user's selection to the processor 120 through the input and output controller 150. In this case, the inputter 170 includes a keypad including at least one hardware button, a touch pad for sensing a touch, etc. For example, the inputter 170 provides touch information sensed through the touch pad to the processor 120 through the input and output controller 150.

Figure 2:
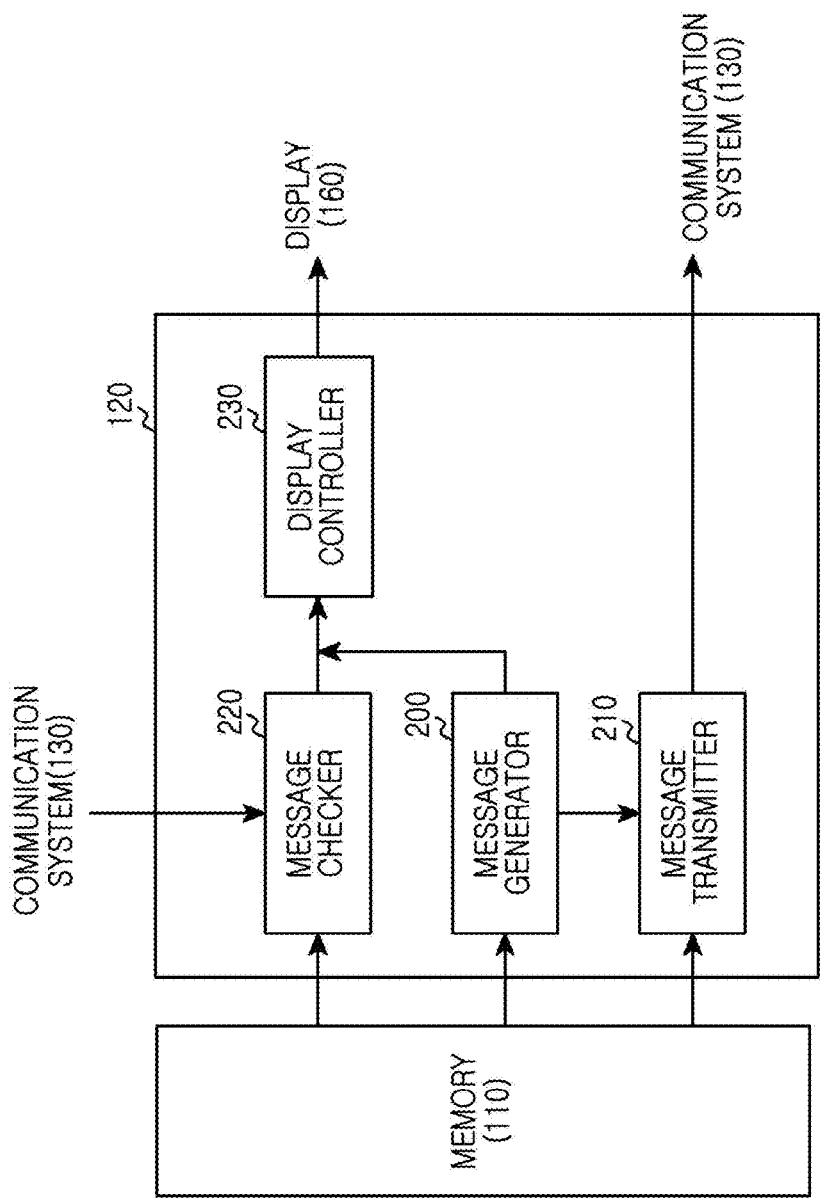
FIG. 2 illustrates a configuration of a processor according to an embodiment of the present disclosure.

FIG. 2 illustrates a configuration of a processor according to an embodiment of the present disclosure.

Referring to FIG. 2, the processor 120 includes a message generator 200, a message transmitter 210, a message checker 220, and a display controller 230.

The message generator 200 may generate a message by executing the message generation program 114 stored in the program storage 111. For example, the message generator 200 may create the message according to touch information of a keypad or input information by a touch pen, which is provided from the inputter 170.

When a hidden message is generated, the message generator 200 may determine one or more hiding areas for hiding at least part of a text in the message. In this case, the message generator 200 may determine the one or more hiding areas at one or more points of time of before, during, and after the message is generated. For example, when a touch on the message display area by the touch pen or user's finger is sensed, the message generator 200 may recognize that a setting event for hiding occurs. Accordingly, the message generator 200 may set the one or more areas of the message display area where the touch is sensed, as the hiding area. For another example, the message generator 200 may set the one or more hiding areas by considering touch information on the message display area after the setting event for hiding occurs. In this case, the message generator 200 may check whether the setting event for hiding occurs by considering one of selection of a hiding setting icon, selection of a hiding setting menu, sensing of a gesture mapped onto the setting event for hiding, etc. The hiding area indicates an area for displaying the hiding frame for hiding at least part of the text of the message.

The message generator 200 may set a hiding check option on the hiding area. For example, the message generator 200 may set an option to check hiding information simply by a scratch operation of the touch pen on the hiding frame. For another example, the message generator 200 may set an authentication key for the hiding frame. For another example, the message generator 200 may limit the number of times the hiding frame can be checked. For another example, the message generator 200 may set as the hiding check option two or more methods of the scratch operation using the touch pen, the authentication key setting method, and the method of setting the number of times the hiding frame can be checked. The scratch operation of the touch pen may indicate a series of operations of scratching the hiding frame with the touch pen.

When a plurality of pieces of hiding information are included in a single message, the message generator 200 may set the same hiding check option for the plurality of pieces of hiding information or may set a different hiding check option for each piece of hiding information.

The message transmitter 210 may control to transmit the message generated by the message generator 200 to the counterpart electronic device by executing the message transmission program 115 stored in the program storage 111. For example, the message transmitter 210 may control to transmit the hidden message generated by the message generator 200 to the counterpart electronic device through the communication system 130. In this case, the message transmitter 210 may control to discriminate between the message generated by the message generator 200 and hiding area information on the message and to transmit the message to the counterpart electronic device. The hiding area information may include one or more of a location of the hiding area included in the message, and size and shape information of the hiding frame.

The message checker 220 may check the message received from the counterpart electronic device by executing the message check program 116 stored in the program storage 111. For example, the message checker 220 may check the text of the message received through the communication 130. When the message includes the hiding area information on the message, the message checker 220 may control not to display the part of the text hidden in the message. Thereafter, when a hiding area checking event occurs, the message checker 220 may control to display the hiding frame in which the part of the text of the message is hidden. In addition, when an input corresponding to the hiding check option of the hiding frame is received from the inputter 170, the message checker 220 may control to remove display of the hiding frame.

The display controller 230 may provide a user interface using graphics through the display 160 by executing the GUI program 113 stored in the program storage 111. That is, the display controller 230 may control to display information on an application driven by the processor 120 on the display 160.

For example, the display controller 230 may control to display the message generated by the message generator 200 on the display 160 as shown in FIG. 5A. In this case, the display controller 230 may control the display 160 to display the hiding frame on the one or more hiding areas determined by the message generator 200. For example, the display controller 230 may control to display the one or more hiding frames on the message displayed on the display 160 as shown in FIGS. 5B to 5D and FIGS. 6A to 6D. Meanwhile, the display controller 230 may control to display the one or more hiding frames on a message display area for displaying the message as shown in FIGS. 8A to 8C. In this case, the display controller 230 may control to display a hiding frame of a shape and size according to hiding frame setting information stored in the data storage 112 on the display 160 or to display a hiding frame of a shape and size according to touch information for setting the hiding area on the display 160.

For another example, the display controller 230 may control to display the message checked by the message checker 220 on the display 160. When the message checker 220 checks the hiding area information on the message, the display controller 230 may control to display the received message on the display 160 without displaying the text of the hiding area in the message as shown in FIG. 14A. When the hiding area checking event occurs, the display controller 230 may control to display the hiding frame 1431 on the display 160 as shown in FIG. 14B. When the message checker 220 checks an input corresponding to the hiding check option of the hiding frame, the display controller 230 may control to display the message texts hidden by the hiding frame on the display 160 as shown in FIGS. 14C and 14F.

In the above-described embodiment, the processor 120 may be configured to include elements for generating and checking the hidden message as separate modules as shown in FIG. 2.

According to another embodiment, the processor 120 may be configured to generate and check a hidden message in a single module.

According to another embodiment, the electronic device 100 may include a separate control module for generating and checking a hidden message.

Figure 3:
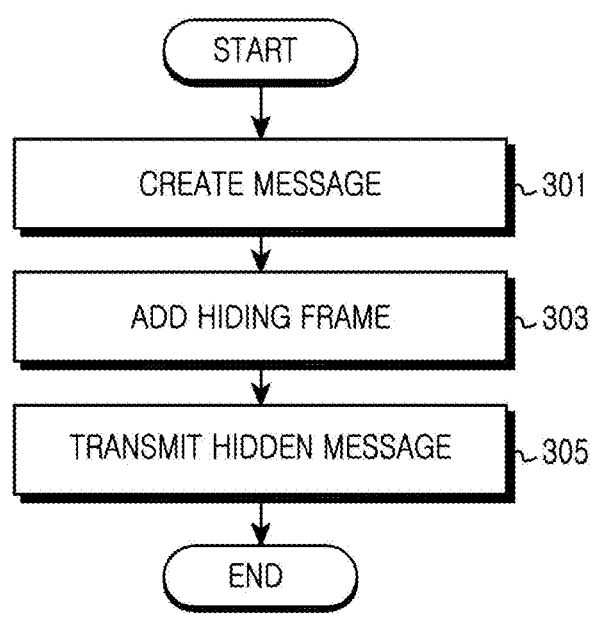
FIG. 3 is a flowchart for transmitting a hidden message in an electronic device according to an embodiment of the present disclosure.

FIG. 3 is a flowchart for transmitting a hidden message in an electronic device according to an embodiment of the present disclosure.

Referring to FIG. 3, the electronic device generates a message in operation 301. For example, the electronic device may create the message according to touch information of a keypad or input information by a touch pen, which is provided from the inputter 170. In this case, the electronic device may display the created message on the display 150 as shown in FIG. 5A.

In operation 303, the electronic device generates a hidden message by adding a hiding frame to at least part of a text of the message. In this case, the electronic device may add one or more hiding frames to a message display area at one or more points of time of before, during, and after the message is created. For example, when a touch on the message display area by a touch pen or user's finger is sensed, the electronic device may recognize that a setting event for hiding occurs. Accordingly, the electronic device may set one or more areas of the message display area where the touch is sensed as a hiding area and may add the hiding frame. For another example, after the setting event for hiding occurs, the electronic device may set the one or more hiding areas by considering touch information on the message display area and may add the hiding frame. In this case, the electronic device may check whether the setting event for hiding occurs by considering one of selection of a hiding setting icon, selection of a hiding setting menu, sensing of a gesture mapped onto the setting event for hiding, etc. The hiding area indicates an area for displaying the hiding frame for hiding at least part of the text of the message.

In operation 305, the electronic device transmits the hidden message to a counterpart electronic device. For example, the electronic device may transmit the hidden message including the one or more hiding frames to the counterpart electronic device. For another example, the electronic device may transmit the message and the hiding area information on the message to the counterpart electronic device. The hiding area information may include one or more pieces of information of location, size, and shape information of the hiding frame included in the message.

In the above-described embodiment, the electronic device may generate the hidden message by adding the one or more hiding frames to the message display area while or after the message is created.

According to another embodiment, the electronic device may generate the hidden message by adding one or more hiding frames to the message display area in advance before the message is created. For example, the electronic device may display one or more hiding frames on the message display area in operation 303. Thereafter, the electronic device may generate the hidden message by displaying the message according to touch information of the keypad or input information by the touch pen, which is provided from the inputter 170, on the message display area where the hiding frame is displayed in operation 301. After generating the hidden message, the electronic device may transmit the hidden message to the counterpart electronic device in operation 305.

Figure 4:
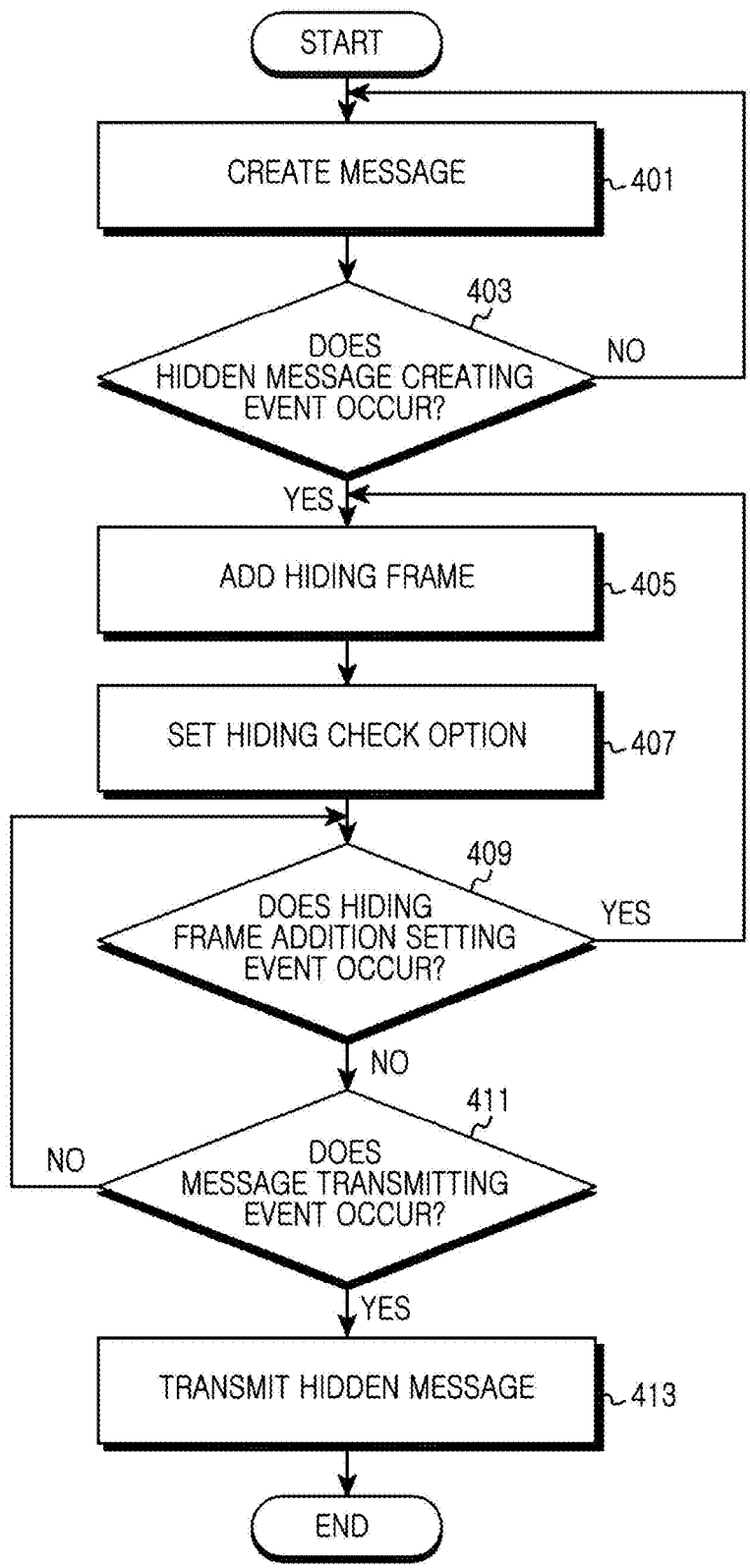
FIG. 4 is a flowchart for generating a hidden message in an electronic device according to a first embodiment of the present disclosure.

FIG. 4 is a flowchart for generating a hidden message in an electronic device according to a first embodiment of the present disclosure.

Referring to FIG. 4, the electronic device creates a message in operation 401. For example, when creating the message, the electronic device may display a message creation screen 500 on the display 160 as shown in FIG. 5A. Thereafter, the electronic device may display the message which is created according to touch information of a keypad or input information by a touch pen, which is provided from the inputter 170, on a message display area 510. In addition, the message creation screen 500 may further include one or more pieces of additional information for the message service from among information 502 on a counterpart electronic device to which the message is to be transmitted, an icon 504 of an address book used for adding counterpart electronic device information, and control menus 522, 524, and 526 for creating, editing, and transmitting the message.

In operation 403, the electronic device checks whether a hidden message creating event occurs. For example, the electronic device may check whether a touch on the message display area 510 shown in FIG. 5A is sensed. For another example, the electronic device may check whether selection of a hiding setting icon is sensed. For another example, the electronic device may check whether the hiding setting menu 524 shown in FIG. 5A is selected. For another example, the electronic device may check whether a gesture matching the hidden message creating event is sensed.

When the hidden message creating event does not occur, the electronic device finishes the present algorithm by returning to operation 401. In this case, the electronic device may transmit the message generated in operation 401 to the counterpart electronic device.

Figure 5B:
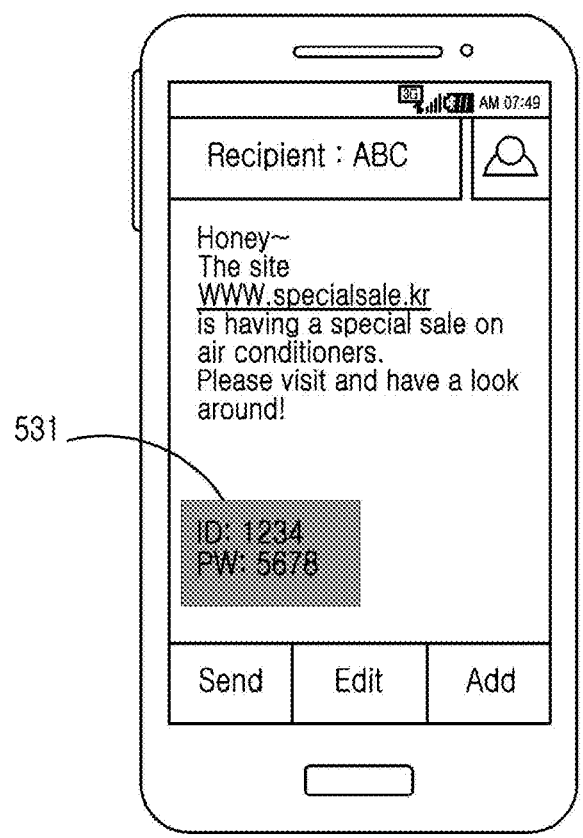

On the other hand, when the hidden message creating event occurs, the electronic device proceeds to operation 405 to add one or more hiding frames to the message display area. In this case, the electronic device may add a hiding frame of a shape and size according to hiding frame setting information stored in the data storage 112 or may add a hiding frame of a shape and size according to touch information for setting a hiding area. For example, when it is determined that the hidden message creating event occurs by considering touch movement information of a rectangular shape on the message display area 510, the electronic device may add a hiding frame 531 of a rectangular shape to the area where the touch is sensed according to the touch information as shown in FIG. 5B. For another example, when the touch movement of the rectangular shape on the message display area 510 is sensed after the hidden message creating event occurs, the electronic device may add the hiding frame 531 of the rectangular shape to the area where the touch is sensed according to the touch information as shown in FIG. 5B. For another example, when a touch on the message display area 510 is sensed after the hidden message creating event occurs, the electronic device may add the hiding frame 531 of the rectangular shape to the touch point according to the shape and size according to the hiding frame setting information stored in the data storage 112.

Figure 6A:
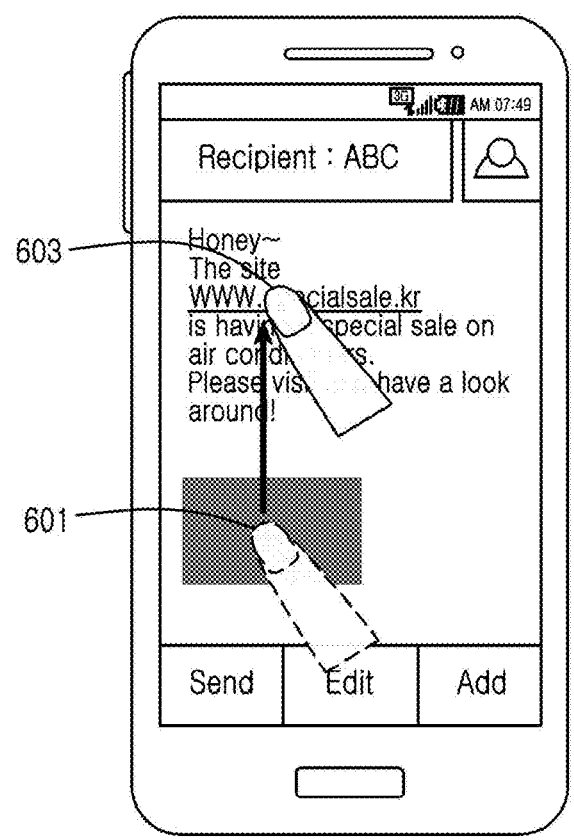
FIGS. 6A, 6B, 6C, and 6D are views illustrating screen configurations for generating a hidden message in an electronic device according to a second embodiment of the present disclosure.
Figure 6B:
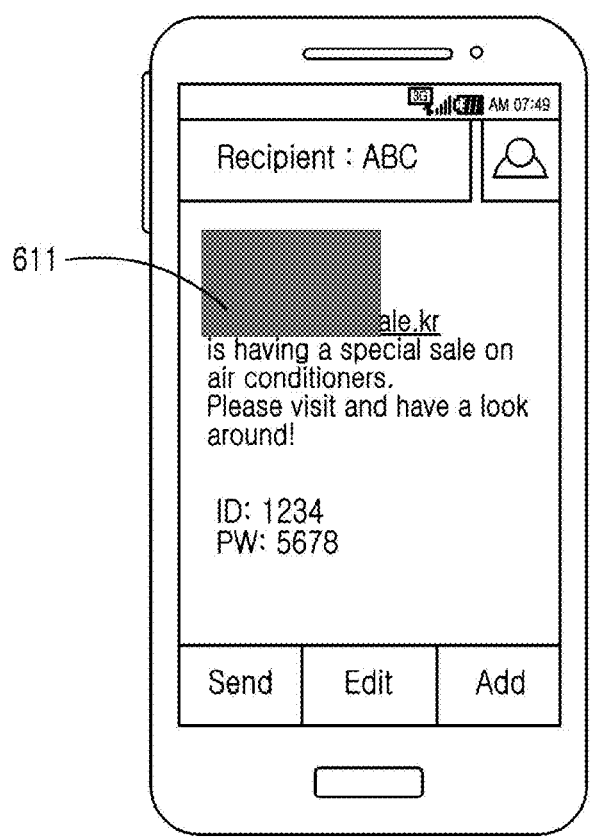

In addition, the electronic device may change the location and size of the hiding frame 531 according to input information provided form the inputter 170. For example, when touch movement (601→603) on the hiding frame 531 is sensed as shown in FIG. 6A, the electronic device may change the location of the hiding frame 531 to a location 611 according to touch movement information as shown in FIG. 6B. For another example, the electronic device may adjust the size of the hiding frame 531 according to touch movement information on a border of the hiding frame 531.

After adding the hiding frame, the electronic device proceeds to operation 407 to set a hiding check option to check at least part of a text of the message hidden by the hiding frame. For example, the electronic device may set an option to check hiding information simply by a scratch operation of a touch pen on the hiding frame. For another example, the electronic device may set an authentication key for the hiding information. For another example, the electronic device may limit the number of times the hiding information can be checked. For another example, the electronic device may set as the hiding check option two or more methods of the scratch operation using the touch pen, the authentication key setting method, and the method of setting the number of times the hiding information can be checked. The scratch operation by the touch pen may indicate a series of operations of scratching the hiding frame with the touch pen.

In operation 409, the electronic device checks whether a hiding frame addition setting event occurs. For example, the electronic device may check whether a touch on the message display area 510 is sensed. For another example, the electronic device may check whether selection of the hiding setting icon is sensed. For another example, the electronic device may check whether the hiding area addition menu 526 shown in FIG. 5A is selected. For another example, the electronic device may check whether a gesture matching the hidden message creating event is sensed.

Figure 6C:
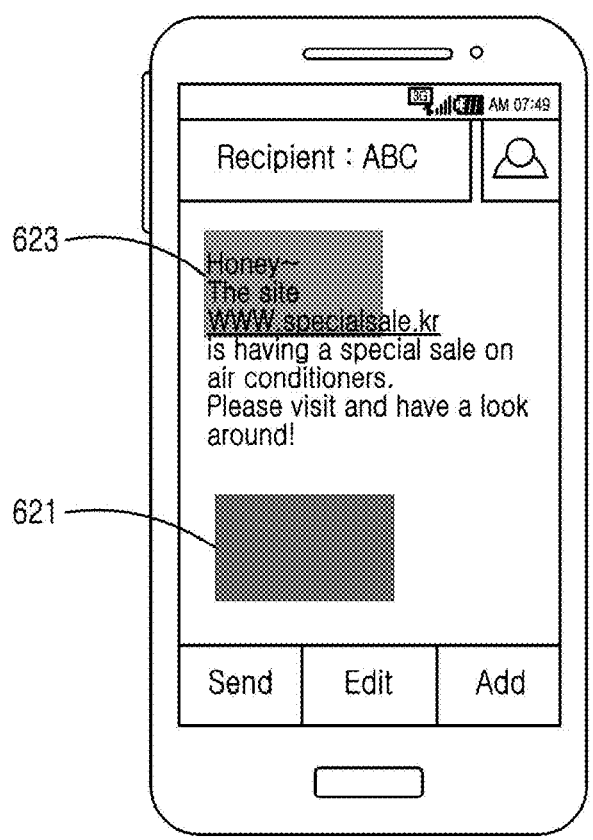

When the hiding frame addition setting event occurs, the electronic device resumes operation 405 to add one or more hiding frames to the message display area. In this case, the electronic device may add a hiding frame of a shape and size according to hiding frame setting information stored in the data storage 112, or may add a hiding frame of a shape and size according to touch information for setting a hiding area. For example, when it is determined that the hiding frame addition setting event occurs by considering touch movement information of a rectangular shape on the message display area, the electronic device may add a hiding frame 623 of a rectangular shape to the area where the touch is sensed according to touch information as shown in FIG. 6C. For another example, when touch movement of a rectangular shape on the message display area is sensed after the hiding frame addition setting event occurs, the electronic device may add the hiding frame 623 of the rectangular shape to the area where the touch is sensed according to touch information as shown in FIG. 6C. For another example, when a touch on the message display area is sensed after the hiding frame addition setting event occurs, the electronic device may add the hiding frame 623 of the rectangular shape to the touch point according to the shape and size according to the hiding frame setting information stored in the data storage 112.

On the other hand, when the hiding frame addition setting event does not occur, the electronic device proceeds to operation 411 to check whether a message transmitting event occurs. For example, the electronic device may check whether selection of the transmission menu 522 shown in FIG. 5A is sensed.

When the message transmitting event does not occur, the electronic device resumes operation 409 to check whether the hiding frame addition setting event occurs. For another example, when the message transmitting event does not occur, the electronic device may modify the message or add a message.

Figure 5C:
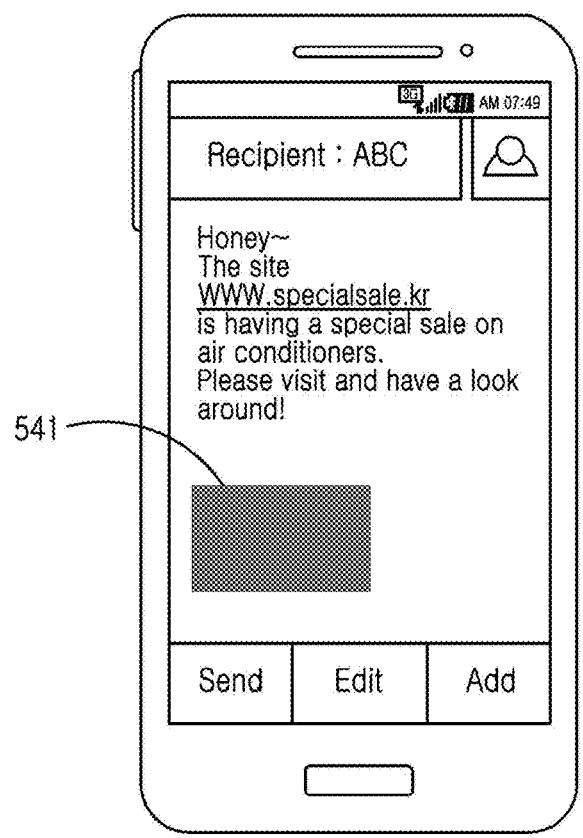
Figure 5D:
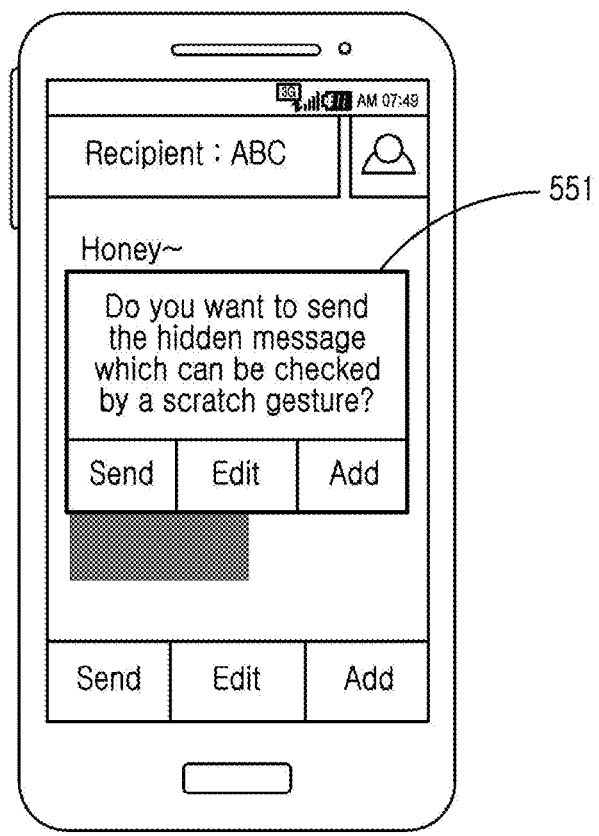

On the other hand, when the message transmitting event occurs, the electronic device proceeds to operation 413 to transmit the hidden message to the counterpart electronic device. For example, the electronic device may transmit the hidden message including the one or more hiding frames to the counterpart electronic device. For another example, the electronic device may transmit the message and hiding area information on the message to the counterpart electronic device. In this case, the electronic device may display hiding check option information 551 on the display again as shown in FIG. 5D and may check whether to transmit the message. The hiding area information may include one or more pieces of information of location, size, and shape information of the hiding frame included in the message.

In the above-described embodiment, the electronic device may set the hiding check option on the hiding frame every time that the hiding frame is added. Accordingly, the electronic device may set a different hiding check option on each of the hiding frames included in the message.

According to another embodiment, the electronic device may add one or more hiding frames to the message and then may set a hiding check option to be commonly applied to the one or more hiding frames added to the message. For example, when the message transmitting event occurs, the electronic device may display an input window for setting the hiding check option and may set the hiding check option to be commonly applied to the one or more hiding frames added to the message.

According to another embodiment, the electronic device may apply a pre-set hiding check option to the one or more hiding frames added to the message. In this case, the electronic device may omit the process for setting the hiding check option in operation 407 while generating the hidden message.

Figure 6D:
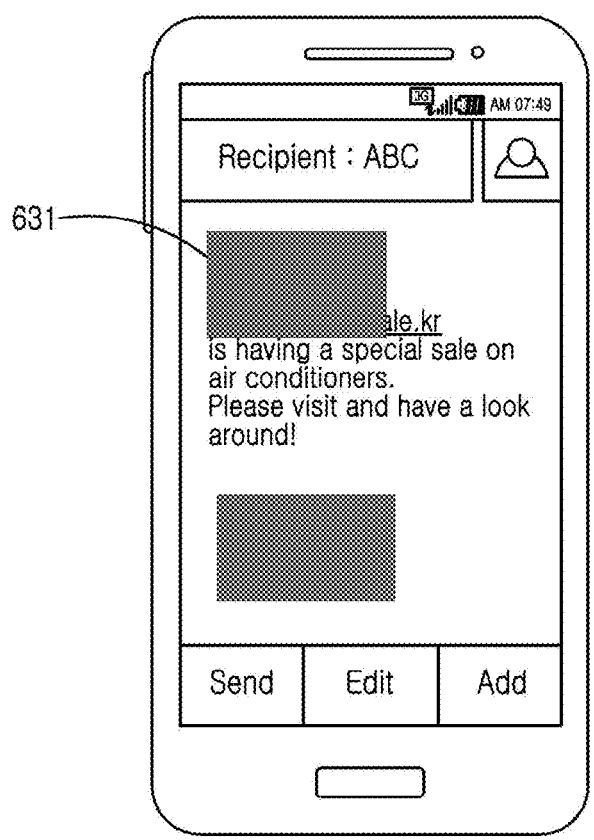

As described above, the electronic device may generate the hidden message by adding the one or more hiding frames to the message display area. In this case, the electronic device may indicate whether the hiding frame setting operation is completed or whether the message creating operation is completed by adjusting transparency of the one or more hiding frames displayed on the message display area. For example, when the electronic device adds the hiding frame 531 to the message display area in operation 405 of FIG. 4 as shown in FIG. 5B, the electronic device may adjust the transparency of the hiding frame 531 to allow the user to check the part of the text hidden by the hiding frame 531, until the hiding check option on the hiding frame 531 is set. When the hiding check option on the hiding frame 531 is set in operation 407 of FIG. 4, the electronic device may adjust the transparency of the hiding frame 541 to have the part of the text of the message hidden by the hiding frame 541 as shown in FIG. 5C. For another example, when the electronic device adds the hiding frame 623 to the message display area in operation 405 of FIG. 4 as shown in FIG. 6C, the electronic device may adjust transparency of the hiding frame 623 to allow the user to check the part of the text hidden by the hiding frame 623, until the hiding check option on the hiding frame 623 is set. In this case, the electronic device may adjust transparency of a first hiding frame 621 on which a hiding check option is set to have the text of the message hidden by the first hiding frame 621. When the hiding check option on the hiding frame 623 is set in operation 407 of FIG. 4, the electronic device may adjust the transparency of the hiding frame 631 to have the part of the text of the message hidden by the hiding frame 631 as shown in FIG. 6D.

Figure 7:
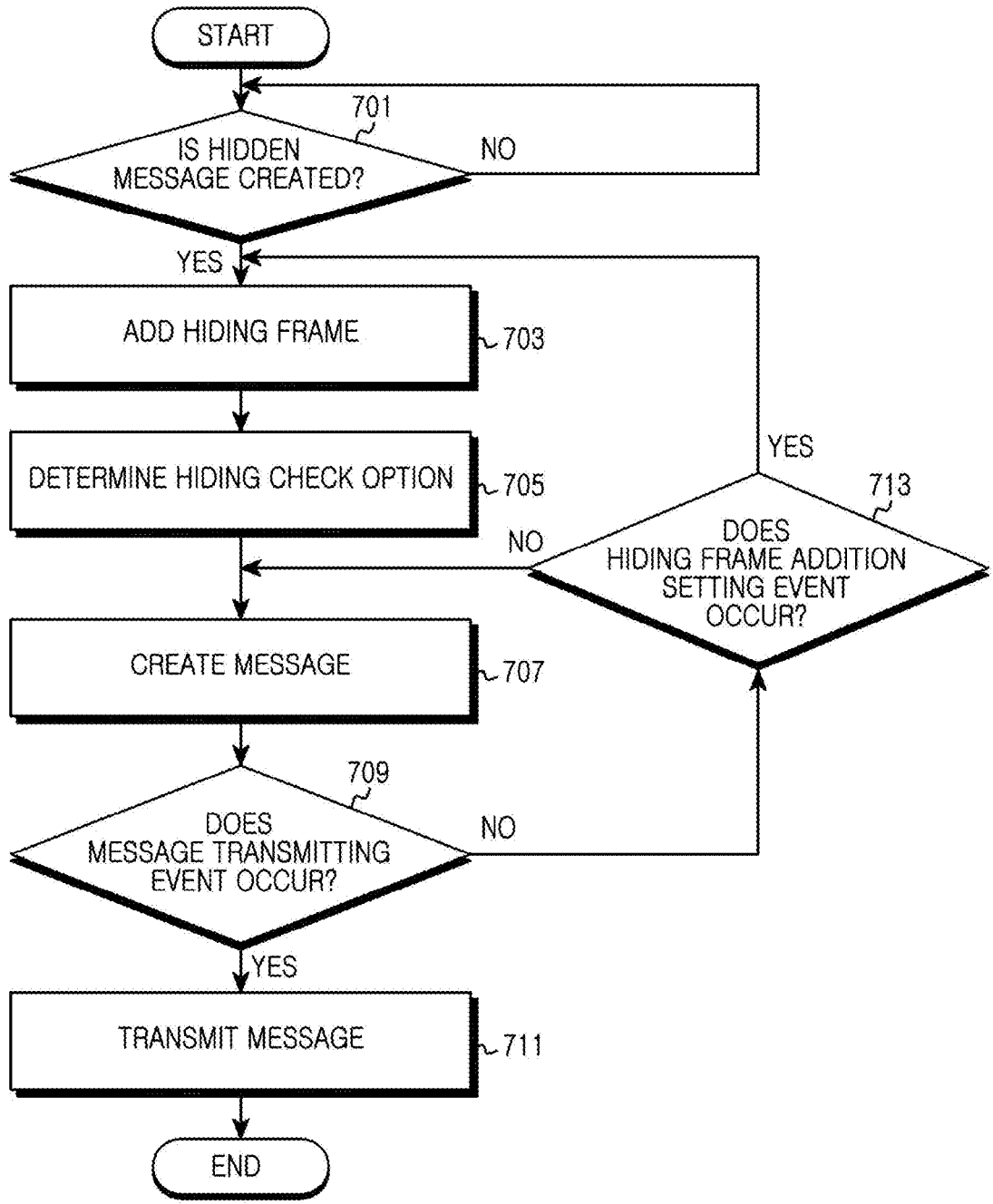
FIG. 7 is a flowchart for generating a hidden message in an electronic device according to the second embodiment of the present disclosure.

FIG. 7 is a flowchart for generating a hidden message in an electronic device according to a second embodiment of the present disclosure.

Referring to FIG. 7, the electronic device checks whether to create a hidden message in operation 701. For example, the electronic device may check whether a hidden message creation program is executed according to input information provided from the inputter 170. For another example, the electronic device may check whether a hidden message creating event occurs. In this case, the electronic device may check whether the hidden message creating event occurs by considering one of selection of a hidden message creating icon, selection of a hidden message creating menu, sensing of a gesture mapped onto the hidden message creating event, and the like. For another example, when creating a message, the electronic device may display a message creation screen 800 on the display 160. When touch movement on a message display area 810 of the message creation screen 800 is sensed, the electronic device may recognize that the hidden message creating event occurs. In addition, the message creation screen 800 may further include one or more pieces of additional information for the message service from among information 802 on a counterpart electronic device to which the message is to be transmitted, an icon 804 of an address book used for adding counterpart electronic device information, and control menus 814, 816, and 818 for creating, editing, and transmitting the message.

When the hidden message is created, the electronic device adds one or more hiding frames to the message display area in operation 703. In this case, the electronic device may add a hiding frame of a shape and size according to hiding frame setting information stored in the data storage 112 or may add a hiding frame of a shape and size according to touch information for setting a hiding area. For example, when it is determined that the hidden message creating event occurs by considering touch movement information of a rectangular shape on the message display area 810, the electronic device may add a hiding frame 812 of a rectangular shape to the area where the touch is sensed according to touch information as shown in FIG. 8A. For another example, when the touch movement of the rectangular shape on the message display area 810 is sensed after the hidden message creating event occurs, the electronic device may add the hiding frame 812 of the rectangular shape to the area where the touch is sensed according to the touch information as shown in FIG. 8A. For another example, when a touch on the message display area 810 is sensed after the hidden message creating event occurs, the electronic device may add the hiding frame 812 of the rectangular shape to the touch point according to the shape and size according to the hiding frame setting information stored in the data storage 112 as shown in FIG. 8A.

In addition, the electronic device may change the location and size of the hiding frame 812 according to input information provided from the inputter 170. For example, when touch movement (821→823) on the hiding frame 812 is sensed as shown in FIG. 8B, the electronic device may change the location of the hiding frame 812 to a location 831 according to the touch movement information as shown in FIG. 8C. For another example, the electronic device may adjust the size of the hiding frame 812 according to touch movement information on a border of the hiding frame 812.

In operation 705, the electronic device sets a hiding check option to check at least part of a text of the message hidden by the hiding frame. For example, the electronic device may set an option to check hiding information simply by a scratch operation of a touch pen on the hiding frame. For another example, the electronic device may set an authentication key for the hiding information. For another example, the electronic device may limit the number of times the hiding information can be checked. For another example, the electronic device may set as the hiding check option two or more methods of the scratch operation using the touch pen, the authentication key setting method, and the method of setting the number of times the hiding information can be checked. The scratch operation by the touch pen may indicate a series of operations of scratching the hiding frame with the touch pen.

In operation 707, the electronic device creates a message. For example, the electronic device may create the message according to touch information of a keypad or input information by a touch pen, which is provided from the inputter 170. In this case, the electronic device may display the created message on the message display area 810 to which the hiding frame has been added as shown in FIG. 8A.

In operation 709, the electronic device checks whether a message transmitting event occurs. For example, the electronic device may check whether selection of the transmission menu 814 shown in FIG. 8A is sensed.

When the message transmitting event does not occur, the electronic device proceeds to operation 713 to check whether a hiding frame addition setting event occurs. For example, the electronic device may check whether a touch on the message display area 810 is sensed. For another example, the electronic device may check whether selection of a hiding setting icon is sensed. For another example, the electronic device may check whether the hiding area addition menu 818 shown in FIG. 8A is selected. For another example, the electronic device may check whether a gesture matching the hidden message creating event is sensed.

When the hiding area addition setting event occurs, the electronic device resumes operation 703 to add one or more hiding frames to the message display area. In this case, the electronic device may add a hiding frame of a shape and size according to hiding frame setting information stored in the data storage 112 or may add a hiding frame of a shape and size according to touch information for setting a hiding area. For example, when it is determined that the hiding frame addition setting event occurs by considering touch movement information of a rectangular shape on the message display area, the electronic device may add the hiding frame 623 of the rectangular shape to the area where the touch is sensed according to touch information as shown in FIG. 6C. For another example, when touch movement of a rectangular shape on the message display area is sensed after the hiding frame addition setting event occurs, the electronic device may add the hiding frame 623 of the rectangular shape to the area where the touch is sensed according to touch information as shown in FIG. 6C. For another example, when a touch on the message display area is sensed after the hiding frame addition setting event occurs, the electronic device may add the hiding frame 623 of the rectangular shape to the touch point according to the shape and size according to the hiding frame setting information stored in the data storage 112 as shown in FIG. 6C.

On the other hand, when the hiding area addition setting event does not occur, the electronic device resumes operation 707 to correct and add the message.

When the message transmitting event occurs in operation 709, the electronic device transmits the hidden message to the counterpart electronic device in operation 711. For example, the electronic device may transmit the hidden message including the one or more hiding frames to the counterpart electronic device. For another example, the electronic device may transmit the message and the hiding area information on the message to the counterpart electronic device. In this case, the electronic device may display the hiding check option information 551 on the display 160 again as shown in FIG. 5D and may check whether to transmit the message again. The hiding area information may include one or more pieces of information of location, size, and shape information of the hiding frame included in the message.

As described above, the electronic device may generate the hidden message by adding the one or more hiding frames to the message display area. In this case, the electronic device may indicate whether the hiding frame setting operation is completed or whether the message creating operation is completed by adjusting transparency of the one or more hiding frames displayed on the message display area. For example, when creating the message, the electronic device may adjust the transparency of the hiding frame to display the message text of the area where the hiding frame is displayed and thus allow the user to check the text of the message created in the hiding frame area, until the message transmitting event occurs.

Hereinafter, a method for checking a hidden message will be explained.

Figure 9:
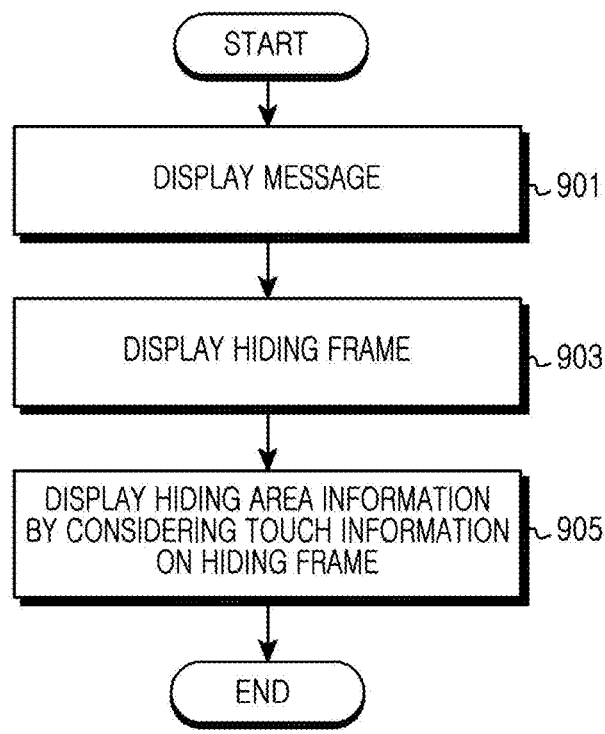
FIG. 9 is a flowchart for checking hiding information of a hidden message in an electronic device according to an embodiment of the present disclosure.

FIG. 9 is a flowchart for checking hiding information in a hidden message in an electronic device according to an embodiment of the present disclosure.

Referring to FIG. 9, the electronic device displays a hidden message on the display 160 in operation 901. For example, when the hidden message is checked, the electronic device may display a text of the hidden message on a message display area 1412 of a message check screen 1400 as shown in FIG. 14A. In this case, the electronic device may not display a message text of a hiding area that is hidden in the hidden message by a hiding frame on the display 160 as shown in FIG. 14A. In addition, when the hidden message includes the hiding area, the electronic device may display a hiding icon (not shown) on a predetermined area of the message check screen 1400. In addition, the message check screen 1400 may further include one or more pieces of additional information for a message service from among information 1402 on a counterpart electronic device which has transmitted the message and control menus 1422 and 1424 for checking and forwarding the message.

In operation 903, the electronic device displays one or more hiding frames in the hidden message. For example, when a hiding area checking event occurs, the electronic device checks the location, shape, and size of the hiding frame included in the hidden message based on hiding area information of the hidden message. Thereafter, the electronic device may display one or more hiding frames 1431 on the message display area 1412 by considering the location, shape, and size of the hiding frame included in the hidden message as shown in FIG. 14B. In this case, the electronic device may check whether the hiding area checking event occurs by considering one of selection of the hiding icon 1414, selection of a hiding area display menu, and sensing of a gesture mapped onto the hiding area checking event.

In operation 905, the electronic device receives input information corresponding to a hiding check option of the hiding frame from the inputter 170 and displays the message text hidden by the hiding frame. For example, when a scratch 1441 on the hiding frame 1431 by a touch pen or user's finger is sensed as shown in FIG. 14C, the electronic device may display a part of the message text hidden by the hiding frame on the display 160 by removing the hiding frame of the scratched area as shown in FIG. 14C. When the size of the hiding frame becomes smaller than a reference size due to the scratch on the hiding frame, the electronic device may display the entire message text hidden by the hiding frame on the display 160 as shown in FIG. 14F. For another example, when an authentication key is set for the hiding frame, the electronic device may display an authentication key input window 1451 on the display 160 as shown in FIG. 14D. When the corresponding hiding frame is authenticated by an authentication key input through the authentication key input window 1451, the electronic device may remove the hiding frame or may remove the hiding frame by the scratch operation on the hiding frame. When the corresponding hiding frame fails to be authenticated by the authentication key input through the authentication key input window 1451, the electronic device may display an authentication failure message on the display 160. For another example, in the case that the number of times the hiding frame can be checked is set, when a touch on the hiding frame is sensed, the electronic device may check whether it is possible to remove the hiding frame by considering the number of times the hiding frame has been checked. When the number of times the hiding frame has been checked exceeds the set number of times the hiding frame can be checked and thus it is not possible to remove the hiding frame, the electronic device may display a message 1461 indicating that the hiding area cannot be checked on the display 160 as shown in FIG. 14E. On the other hand, when it is not possible to check the hiding frame, the electronic device may remove the hiding frame by the scratch operation on the hiding frame.

As described above, the electronic device may receive input information corresponding to the hiding check option of the hiding frame from the inputter 170 and may display the message text hidden by the hiding frame. When a plurality of hiding frames exist in the hidden message, the electronic device may remove a corresponding hiding frame by considering input information on each of the hiding frames.

Figure 10:
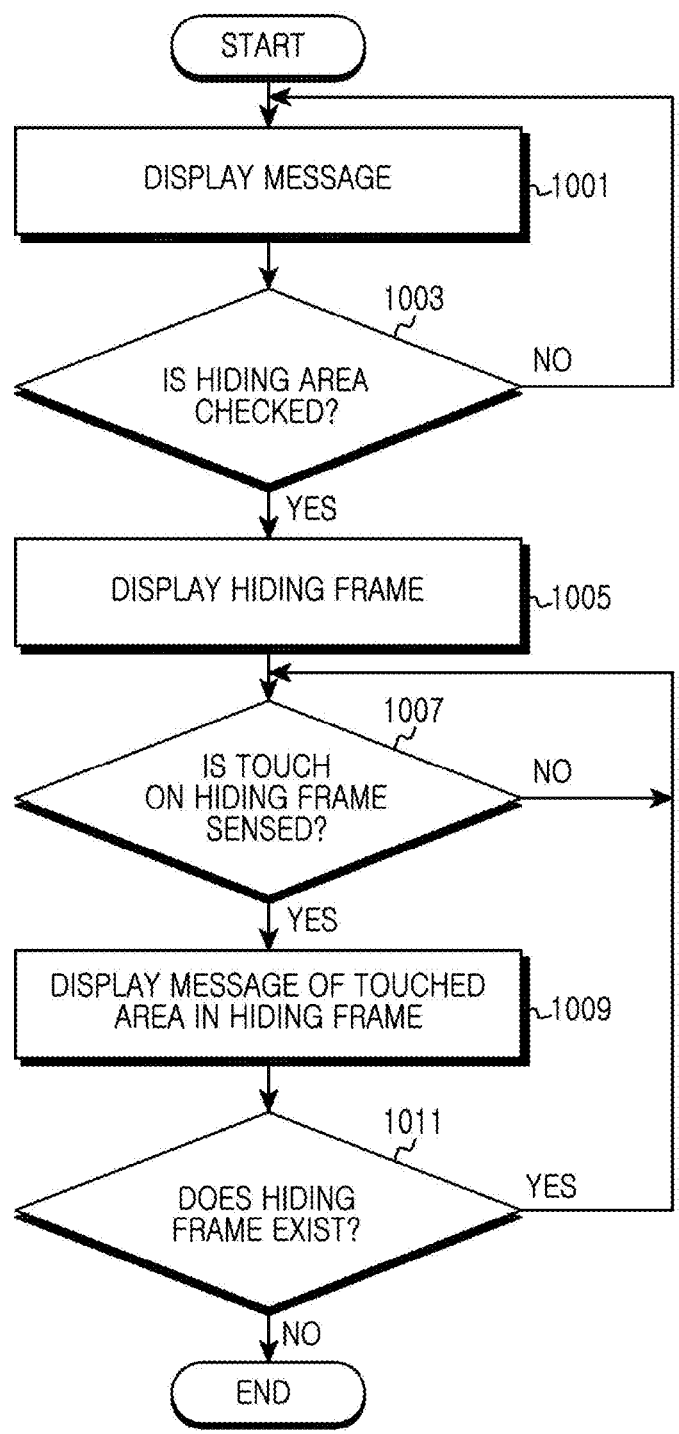
FIG. 10 is a flowchart for checking a hidden message in an electronic device according to the first embodiment of the present disclosure.

FIG. 10 is a flowchart for checking a hidden message in an electronic device according to the first embodiment of the present disclosure.

Referring to FIG. 10, the electronic device displays a hidden message on the display 160 in operation 1001. For example, when the electronic device receives the hidden message from a counterpart electronic device, the electronic device may display a text of the hidden message on the message display area 1412 of the message check screen 1400 as shown in FIG. 14A. For another example, when the hidden message is checked according to an input signal provided from the inputter 170, the electronic device may display the text of the hidden message on the message display area 1412 of the message check screen 1400 as shown in FIG. 14A. In this case, the electronic device may not display a message text of a hiding area that is hidden in the hidden message by a hiding frame on the display 160 as shown in FIG. 14A. In addition, when the hidden message includes the hiding area, the electronic device may display the hiding icon 1414 on a predetermined area of the message check screen 1400.

In operation 1003, the electronic device checks whether a hiding area checking event occurs. For example, the electronic device may check whether the hiding icon 1414 shown in FIG. 14A is selected. For another example, the electronic device may check whether a hiding area display menu is selected. For another example, the electronic device may check whether a gesture mapped onto the hiding area checking event is sensed.

When the hiding area checking event does not occur, the electronic device resumes operation 1001 to continue displaying the message.

On the other hand, when the hiding area checking event occurs, the electronic device displays one or more hiding frames in the hidden message in operation 1005. For example, the electronic device may check the location, shape, and size of the hiding frame included in the hidden message based on hiding area information of the hidden message. Thereafter, the electronic device may display the one or more hiding frames 1431 on the message display area 1412 by considering the location, shape, and size of the hiding frame included in the hidden message as shown in FIG. 14B.

In operation 1007, the electronic device checks whether a scratch on the one or more hiding frames included in the hidden message is sensed. For example, the electronic device may check whether the scratch 1441 on the hiding frame 1431 by the touch pen or user's finger is sensed as shown in FIG. 14C.

When the scratch on the hiding frame is sensed, the electronic device displays a part of the text of the message hidden by the hiding frame on the display 160 by removing the area where the scratch is sensed from the hiding frame in operation 1009. For example, when the scratch 1441 on the hiding frame 1431 by the touch pen or user's finger is sensed, the electronic device may display a part of the message text hidden by the hiding frame on the display 160 by removing display of the hiding frame of the area where the scratch is sensed from the hiding frame as shown in FIG. 14C.

In operation 1011, the electronic device checks whether an unscratched area exists in the hiding frame or whether an unscratched hiding frame exists.

When the unscratched area exists in the hiding frame or the unscratched hiding frame exists, the electronic device resumes operation 1007 to check whether the scratch on the one or more hiding frames included in the hidden message is sensed. In addition, when a storing event occurs, the electronic device may store the hidden message with only a part of the hiding frame being removed.

On the other hand, when the unscratched area does not exist in the hiding frame and the unscratched hiding frame does not exist, the electronic device finishes the present algorithm. That is, the electronic device may display the entire text of the hidden message on the display 160 as shown in FIG. 14F.

Figure 11:
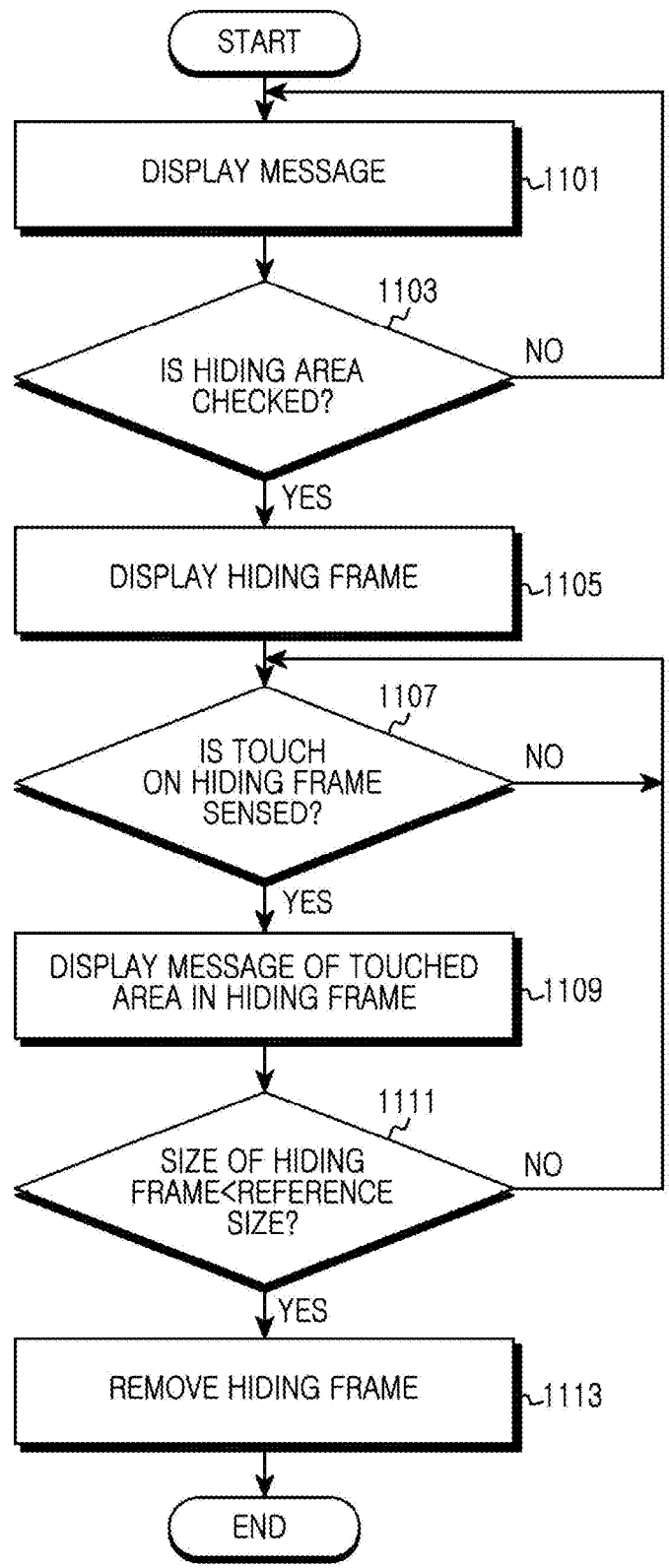
FIG. 11 is a flowchart for checking a hidden message in an electronic device according to the second embodiment of the present disclosure.

FIG. 11 is a flowchart for checking a hidden message in an electronic device according to the second embodiment of the present disclosure.

Referring to FIG. 11, the electronic device displays a hidden message on the display 160 in operation 1101. For example, when the electronic device receives the hidden message from a counterpart electronic device, the electronic device may display a text of the hidden message on the message display area 1412 of the message check screen 1400 as shown in FIG. 14A. For another example, when the hidden message is checked according to an input signal provided from the inputter 170, the electronic device may display the text of the hidden message on the message display area 1412 of the message check screen 1400 as shown in FIG. 14A. In this case, the electronic device may not display a message text of a hiding area that is hidden in the hidden message by a hiding frame on the display 160 as shown in FIG. 14A. In addition, when the hidden message includes the hiding area, the electronic device may display the hiding icon 1414 on a predetermined area of the message check screen 1400.

In operation 1103, the electronic device checks whether a hiding area checking event occurs. For example, the electronic device may check whether the hiding icon 1414 shown in FIG. 14A is selected. For another example, the electronic device may check whether a hiding area display menu is selected. For another example, the electronic device may check whether a gesture mapped onto the hiding area checking event is sensed.

When the hiding area checking event does not occur, the electronic device resumes operation 1101 to continue displaying the message.

On the other hand, when the hiding area checking event occurs, the electronic device displays one or more hiding frames in the hidden message in operation 1105. For example, the electronic device may check the location, shape, and size of the hiding frame included in the hidden message based on hiding area information of the hidden message. Thereafter, the electronic device may display the one or more hiding frames 1431 in the message display area 1412 by considering the location, shape, and size of the hiding frame included in the hidden message as shown in FIG. 14B.

In operation 1107, the electronic device checks whether a scratch on the one or more hiding frames included in the hidden message is sensed. For example, the electronic device may check whether the scratch 1441 on the hiding frame 1431 by the touch pen or user's finger is sensed as shown in FIG. 14C.

When the scratch on the hiding frame is sensed, the electronic device displays a part of the text of the message hidden by the hiding frame on the display 160 by removing the area where the scratch is sensed from the hiding frame in operation 1109. For example, when the scratch 1441 on the hiding frame 1431 by the touch pen or user's finger is sensed, the electronic device may display a part of the message text hidden by the hiding frame on the display 160 by removing display of the hiding frame of the area where the scratch is sensed from the hiding frame as shown in FIG. 14C.

In operation 1111, the electronic device checks whether a size of an unscratched area in the hiding frame is smaller than a reference size. For example, the electronic device may check whether the size of the area that is not scratched in the hiding frame 1431 by the scratch 1441 on the hiding frame 1431 shown in FIG. 14C is smaller than the reference size.

When the size of the unscratched area in the hiding frame is larger than or equal to the reference size, the electronic device resumes operation 1107 to check whether the scratch on the one or more hiding frames included in the hidden message is sensed. In addition, when a storing event occurs, the electronic device may store the hidden message with only a part of the hiding frame being removed.

On the other hand, when the size of the unscratched area in the hiding frame is smaller than the reference size, the electronic device proceeds removes the corresponding hiding frame and displays the entire text of the hidden message on the display 160 in operation 1113. For example, when the area that is not scratched by the scratch 1441 on the hiding frame shown in FIG. 14C is smaller than the reference size, the electronic device recognizes that the scratch occurs on the entire area of the hiding frame 1431. Accordingly, the electronic device may display the entire text of the hidden message on the display 160 by removing the hiding frame 1431 from the hidden message as shown in FIG. 14F.

Figure 12:
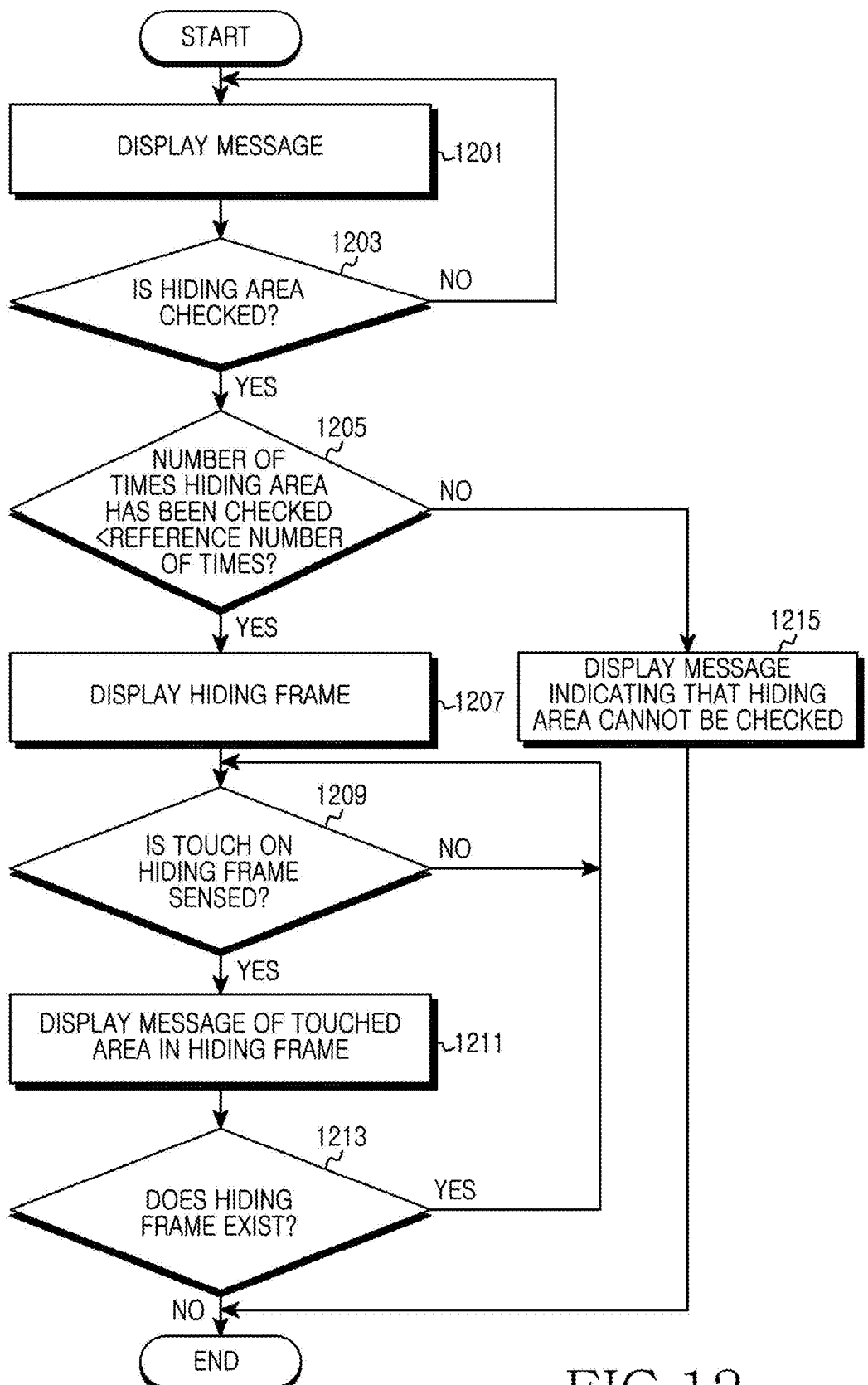
FIG. 12 is a flowchart for checking a hidden message in an electronic device according to the third embodiment of the present disclosure.

FIG. 12 is a flowchart for checking a hidden message in an electronic device according to the third embodiment of the present disclosure.

Referring to FIG. 12, the electronic device displays a hidden message on the display 160 in operation 1201. For example, when the electronic device receives the hidden message from a counterpart electronic device, the electronic device may display a text of the hidden message on the message display area 1412 of the message check screen 1400 as shown in FIG. 14A. For another example, when the hidden message is checked according to an input signal provided from the inputter 170, the electronic device may display the text of the hidden message on the message display area 1412 of the message check screen 1400 as shown in FIG. 14A. In this case, the electronic device may not display a message text of a hiding area that is hidden in the hidden message by a hiding frame on the display 160 as shown in FIG. 14A. In addition, when the hidden message includes the hiding area, the electronic device may display the hiding icon 1414 on a predetermined area of the message check screen 1400.

In operation 1203, the electronic device checks whether a hiding area checking event occurs. For example, the electronic device may check whether the hiding icon 1414 shown in FIG. 14A is selected. For another example, the electronic device may check whether a hiding area display menu is selected. For another example, the electronic device may check whether a gesture mapped onto the hiding area checking event is sensed.

When the hiding area checking event does not occur, the electronic device resumes operation 1201 to continue displaying the message.

On the other hand, when the hiding area checking event occurs, the electronic device checks whether the number of times the hiding area of the hidden message has been checked is less than a reference number of times in operation 1205. When a plurality of hiding frames are included in the hidden message, the electronic device may check whether there is one or more hiding frames that have been checked a number of times less than the reference number of times. The reference number of times is a hiding check option on the one or more hiding frames included in the hidden message and may be set by the counterpart electronic device.

When the number of times that the hiding area of the hidden message has been checked is greater than or equal to the reference number of times, the electronic device may recognize that it is not possible to check the hiding area of the hidden message. Accordingly, the electronic device displays a message indicating that the hiding area cannot be checked on the display 160 in operation 1215. For example, the electronic device may display the message indicating that the hiding information on the hidden message cannot be checked on the display 160 as shown in FIG. 14E.

On the other hand, when the number of times the hiding area of the hidden message has been checked is less than the reference number of times, the electronic device displays the one or more hiding frames in the hidden message in operation 1207. For example, the electronic device may check the location, shape, and size of the hiding frame included in the hidden message based on hiding area information of the hidden message. Thereafter, the electronic device may display the one or more hiding frames 1431 in the message display area 1412 by considering the location, shape, and size of the hiding frame included in the hidden message as shown in FIG. 14B.

In operation 1209, the electronic device checks whether a scratch on the one or more hiding frames included in the hidden message is sensed. For example, the electronic device may check whether the scratch 1441 on the hiding frame 1431 by the touch pen or user's finger is sensed as shown in FIG. 14C.

When the scratch on the hiding frame is sensed, the electronic device displays a part of the text of the message hidden by the hiding frame on the display 160 by removing the area where the scratch is sensed from the hiding frame in operation 1211. For example, when the scratch 1441 on the hiding frame 1431 by the touch pen or user's finger is sensed, the electronic device may display a part of the message text hidden by the hiding frame by removing display of the hiding frame of the area where the scratch is sensed from the hiding frame as shown in FIG. 14C.

In this case, the electronic device proceeds to operation 1213 to check whether an unscratched area exists in the hiding frame or whether an unscratched hiding frame exists.

When the unscratched area exists in the hiding frame or the unscratched hiding frame exists, the electronic device checks whether the scratch on the one or more hiding frames included in the hidden message is sensed in operation 1209. In addition, when a storing event occurs, the electronic device may store the hidden message with only a part of the hiding frame being removed.

On the other hand, when the unscratched area does not exist in the hiding frame and the unscratched hiding frame does not exist, the electronic device finishes the present algorithm. That is, the electronic device may display the entire text of the hidden message on the display 160 as shown in FIG. 14F.

Figure 13:
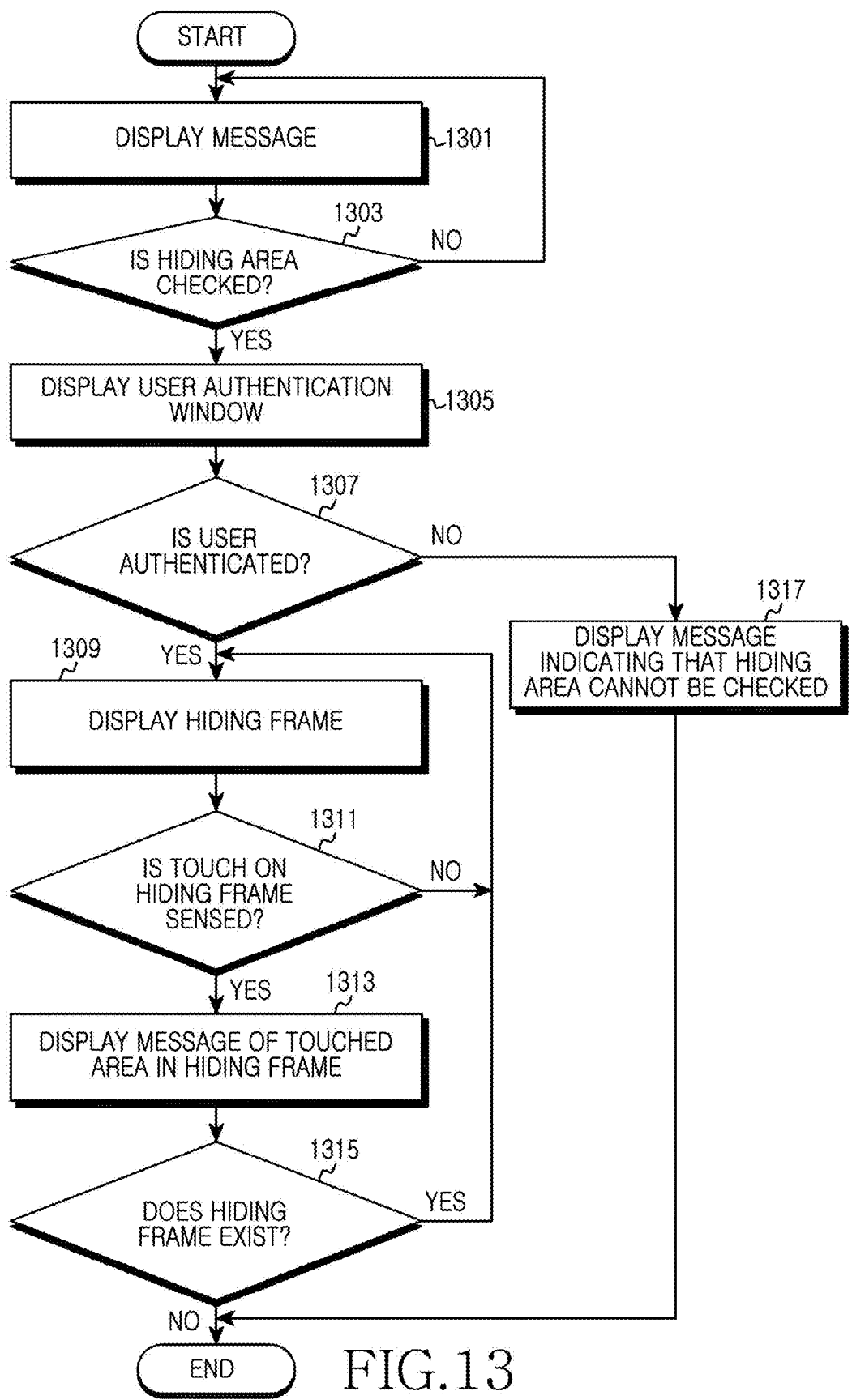
FIG. 13 is a flowchart for checking a hidden message in an electronic device according to a fourth embodiment of the present disclosure.

FIG. 13 is a flowchart for checking a hidden message in an electronic device according to a fourth embodiment of the present disclosure.

Referring to FIG. 13, the electronic device displays a hidden message on the display 160 in operation 1301. For example, when the electronic device receives the hidden message from a counterpart electronic device, the electronic device may display a text of the hidden message on the message display area 1412 of the message check screen 1400 as shown in FIG. 14A. For another example, when the hidden message is checked according to an input signal provided from the inputter 170, the electronic device may display the text of the hidden message on the message display area 1412 of the message check screen 1400 as shown in FIG. 14A. In this case, the electronic device may not display a message text of a hiding area that is hidden in the hidden message by a hiding frame on the display 160 as shown in FIG. 14A. In addition, when the hidden message includes the hiding area, the electronic device may display the hiding icon 1414 on a predetermined area of the message check screen 1400.

In operation 1303, the electronic device checks whether a hiding area checking event occurs. For example, the electronic device may check whether the hiding icon 1414 shown in FIG. 14A is selected. For another example, the electronic device may check whether a hiding area display menu is selected. For another example, the electronic device may check whether a gesture mapped onto the hiding area checking event is sensed.

When the hiding area checking event does not occur, the electronic device resumes operation 1301 to continue displaying the message.

On the other hand, when the hiding area checking event occurs, the electronic device displays a user authentication window on the display 160 in operation 1305. For example, the electronic device may display a user authentication window 1451 for receiving input of an authentication key from the user on the display 160 as shown in FIG. 14D.

In operation 1307, to the electronic device checks whether the user can be authenticated based on authentication information received through the user authentication window. For example, the electronic device may check an authentication key which is set for the hiding frame in the hiding area information of the hidden message. Thereafter, the electronic device may check whether the user can be authenticated by comparing the authentication key received from the inputter 170 and the authentication key set for the hiding frame. For another example, when the hiding area information of the hidden message does not include the authentication key set for the hiding frame, the electronic device requests the authentication key from the counterpart electronic device which has transmitted the hidden message. Thereafter, the electronic device may check whether the user can be authenticated by comparing the authentication key provided from the inputter 170 and the authentication key provided from the counterpart electronic device.

When the user cannot be authenticated, the electronic device recognizes that it is not possible to check the hiding area of the hidden message. Accordingly, the electronic device displays a message indicating that the hiding area cannot be checked on the display 160 in operation 1317.

On the other hand, when the user can be authenticated, the electronic device displays one or more hiding frames in the hidden message in operation 1309. For example, the electronic device may check the location, shape, and size of the hiding frame included in the hidden message based on the hiding area information of the hidden message. Thereafter, the electronic device may display the one or more hiding frames 1431 on the message display area 1412 by considering the location, shape, and size of the hiding frame included in the hidden message as shown in FIG. 14B.

The electronic device checks whether a scratch on the one or more hiding frames included in the hidden message is sensed in operation 1311. For example, the electronic device may check whether the scratch 1441 on the hiding frame 1431 by the touch pen or user's finger is sensed as shown in FIG. 14C.

When the scratch on the hiding frame is sensed, the electronic device displays a part of the text of the message hidden by the hiding frame on the display 160 by removing the area where the scratch is sensed from the hiding frame in operation 1313. For example, when the scratch 1441 on the hiding frame 1431 by the touch pen or user's finger is sensed, the electronic device may display a part of the message text hidden by the hiding frame on the display 160 by removing display of the hiding frame of the area where the scratch is sensed from the hiding frame as shown in FIG. 14C.

In operation 1315, the electronic device checks whether an unscratched area exists in the hiding frame or whether an unscratched hiding frame exists.

When the unscratched area exists in the hiding frame or the unscratched hiding frame exists, the electronic device resumes checks whether the scratch on the one or more hiding frames included in the hidden message is sensed in operation 1309. In addition, when a storing event occurs, the electronic device may store the hidden message with only a part of the hiding frame being removed.

On the other hand, when the unscratched area does not exist in the hiding frame and the unscratched hiding frame does not exist, the electronic device finishes the present algorithm. That is, the electronic device may display the entire text of the hidden message on the display 160 as shown in FIG. 14F.

As described above, the electronic device transmits the message in which at least part of the text is hidden to the counterpart electronic device, so that the important message cannot be easily exposed to the outside and counterpart's attention can be focused on the hidden text.

In addition, the electronic device may set an option to check the message in which at least part of the text is hidden through user authentication or limit the number of times the message in which at least part of the text is hidden can be checked, so that security for the important information included in the message can be enhanced.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a communication circuitry;
at least one processor operatively connected to the display and the communication circuitry; and
a memory, storing instructions that, when executed by the at least one processor, cause the electronic device to:
control the communication circuitry to receive a message transmitted from a counterpart electronic device, wherein the received message comprises text data and information on a hiding frame for hiding the text data,
display the received message on the display without the hiding frame,
receive a user input for selecting a hiding area display menu, and
based on the user input for selecting the hiding area display menu, display the received message with the hiding frame hiding at least a part of the text data.

2. The electronic device of claim 1,
wherein the instructions further cause the electronic device to:
receive a touch input for selecting the hiding frame, and
wherein the received message is configured to gradually reveal at least a portion of the hidden text data in response to the touch input.

3. The electronic device of claim 1, wherein the user input for selecting the hiding area display menu comprises a touch input on the hiding area display menu.

4. The electronic device of claim 1, wherein the instructions further cause the electronic device to:
display, on the display, the received message with a hiding icon to display the hiding frame based on a user input for selecting the hiding icon.

5. A method for an electronic device, the method comprising:
receiving a message transmitted from a counterpart electronic device, wherein the received message comprises text data and hiding information on a hiding frame for hiding the text data;
displaying the received message on the display without the hiding frame;
receiving a user input for selecting a hiding area display menu; and
based on the user input for selecting the hiding area displaying menu, displaying the received message with the hiding frame hiding at least a part of the text data.

6. The method of claim 5, further comprising:
receiving a touch input for selecting the hiding frame, and
wherein the received message is configured to gradually reveal at least a portion of the hidden text data in response to the touch input.

7. The method of claim 5, wherein the user input for selecting the hiding area display menu comprises a touch input on the hiding area display menu.

8. The method of claim 5, further comprising
displaying the received message with a hiding icon to display the hiding frame based on a user input for selecting the hiding icon.

9. An electronic device comprising:
a display;
a communication circuitry;
at least one processor operatively connected to the display and the communication circuitry; and
a memory, storing instructions that, when executed by the at least one processor, cause the electronic device to:
receive a first user input to select a hiding area display menu,
control the communication circuitry to receive a message transmitted from a counterpart electronic device, wherein the received message comprises text data and hiding information on a hiding frame for hiding at least a part of the text data,
and
based on the selection of the hiding area display menu:
display the received message with a hiding icon for the hiding frame, without displaying the hiding frame, on the display,
receive a second user input for selecting the hiding icon, and
based on the second user input, display the received message with the hiding frame hiding at least a part of the text data.

10. The electronic device of claim 9, wherein the instructions further cause the electronic device to:
based on the first user input for selecting the hiding area display menu being to display the hiding frame upon receipt of a message, display the received message with the hiding frame hiding at least a part of the text data.

11. The electronic device of claim 10,
wherein the instructions further cause the electronic device to:
receive a touch input for selecting the hiding frame, and
wherein the received message is configured to gradually reveal at least a portion of the hidden text data in response to the touch input.

12. The electronic device of claim 9,
wherein the first user input for selecting the hiding area display menu comprises a touch input on the hiding area display menu.

13. A method for an electronic device, the method comprising:

receiving a first user input to select a hiding area display menu;

receiving a message transmitted from a counterpart electronic device, wherein the received message comprises text data and hiding information on a hiding frame for hiding the text data;

and based on the selection of the hiding area display menu:
- displaying the received message with a hiding icon for the hiding frame, without the displaying the hiding frame, on the display;
- receiving a second user input for selecting the hiding icon; and
- based on the second user input, displaying the received message with the hiding frame hiding at least a part of the text data.

14. The method of claim 13, wherein the method further comprises:

based on the first user input for selecting the hiding area display menu being to display the hiding frame upon receipt of a message, display the received message with the hiding frame hiding at least a portion of the text data.

15. The method of claim 14, wherein the method further comprises receiving a touch input for selecting the hiding frame, and wherein the received message is configured to gradually reveal at least a portion of the hidden text data in response to the touch input.

16. The method of claim 13, wherein the first user input for selecting the hiding area display menu comprises a touch input on hiding area display menu.

* * * * *